United States Patent
Salvador

(10) Patent No.: US 10,152,298 B1
(45) Date of Patent: Dec. 11, 2018

(54) CONFIDENCE ESTIMATION BASED ON FREQUENCY

(71) Applicant: Amazon Technologies, Inc., Seattle, WA (US)

(72) Inventor: Stan Weidner Salvador, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 26 days.

(21) Appl. No.: 14/754,181

(22) Filed: Jun. 29, 2015

(51) Int. Cl.
| | |
|---|---|
| *G10L 15/187* | (2013.01) |
| *G10L 15/08* | (2006.01) |
| *G10L 15/22* | (2006.01) |
| *G10L 15/26* | (2006.01) |
| *G10L 15/16* | (2006.01) |
| *G10L 15/06* | (2013.01) |
| *G10L 15/10* | (2006.01) |
| *G06F 3/16* | (2006.01) |
| *G10L 15/02* | (2006.01) |
| *G10L 25/12* | (2013.01) |
| *G10L 15/18* | (2013.01) |

(52) U.S. Cl.
CPC .............. *G06F 3/167* (2013.01); *G10L 15/02* (2013.01); *G10L 15/063* (2013.01); *G10L 15/1815* (2013.01); *G10L 15/22* (2013.01); *G10L 25/12* (2013.01); *G10L 2015/223* (2013.01)

(58) Field of Classification Search
CPC ....... G10L 15/187; G10L 15/08; G10L 15/22; G10L 15/265; G10L 15/16; G10L 15/063; G10L 15/10
See application file for complete search history.

(56) References Cited

U.S. PATENT DOCUMENTS

| | | | | |
|---|---|---|---|---|
| 5,428,707 A | * | 6/1995 | Gould | G09B 19/04 |
| | | | | 704/231 |
| 5,488,652 A | * | 1/1996 | Bielby | G10L 15/063 |
| | | | | 379/213.01 |
| 5,621,859 A | * | 4/1997 | Schwartz | G10L 15/142 |
| | | | | 704/256 |
| 5,710,864 A | * | 1/1998 | Juang | G10L 15/142 |
| | | | | 704/231 |
| 5,727,124 A | * | 3/1998 | Lee | G10L 15/065 |
| | | | | 704/233 |

(Continued)

*Primary Examiner* — Anne L Thomas-Homescu
(74) *Attorney, Agent, or Firm* — Pierce Atwood LLP

(57) ABSTRACT

Devices, systems and methods are disclosed for estimating a prior probability for speech recognition by taking into account a number of observations of a particular word and a prior probability for a group of words having a similar number of observations. For example, a prior probability may be determined by combining a number of correct results and a number of observations for a group of words and calculating a prior probability of the entire group. Further, a prior probability may be determined for a word that was not previously observed by determining a prior probability for a group of words that have been observed once. The prior probability for a particular word may be determined differently as the number of observations increases and may transition from the group prior probability to an individual prior probability when the number of observations exceeds a threshold.

24 Claims, 21 Drawing Sheets

(56) References Cited

U.S. PATENT DOCUMENTS

| | | | | |
|---|---|---|---|---|
| 5,829,000 A * | 10/1998 | Huang | G10L 15/22 | 704/240 |
| 5,842,163 A * | 11/1998 | Weintraub | G10L 15/10 | 704/231 |
| 5,850,627 A * | 12/1998 | Gould | G09B 19/04 | 704/231 |
| 5,995,929 A * | 11/1999 | Gupta | G10L 15/063 | 379/88.01 |
| 6,067,514 A * | 5/2000 | Chen | G06F 17/2715 | 704/235 |
| 6,178,401 B1 * | 1/2001 | Franz | G10L 15/08 | 704/238 |
| 6,208,964 B1 * | 3/2001 | Sabourin | G10L 15/063 | 704/235 |
| 6,275,801 B1 * | 8/2001 | Novak | G10L 15/08 | 704/252 |
| 6,629,069 B1 * | 9/2003 | Attwater | G10L 15/26 | 704/231 |
| 6,662,160 B1 * | 12/2003 | Chien | G10L 15/20 | 704/256 |
| 7,043,429 B2 * | 5/2006 | Chang | G10L 15/32 | 704/236 |
| 7,133,827 B1 * | 11/2006 | Gillick | G10L 15/063 | 704/243 |
| 7,206,389 B1 * | 4/2007 | Dumoulin | G10L 15/1822 | 379/218.01 |
| 7,228,275 B1 * | 6/2007 | Endo | G10L 15/32 | 704/231 |
| 7,447,636 B1 * | 11/2008 | Schwartz | G10L 15/19 | 379/88.01 |
| 7,657,433 B1 * | 2/2010 | Chang | G10L 15/08 | 704/236 |
| 7,698,136 B1 * | 4/2010 | Nguyen | G10L 15/08 | 704/231 |
| 8,650,031 B1 * | 2/2014 | Mamou | G10L 15/08 | 704/2 |
| 9,037,967 B1 * | 5/2015 | Al-Jefri | G06F 17/273 | 715/257 |
| 9,269,349 B2 * | 2/2016 | Xiao | G10L 15/065 | |
| 9,336,772 B1 * | 5/2016 | Salvador | G10L 15/183 | |
| 9,367,526 B1 * | 6/2016 | Vozila | G06Q 10/107 | |
| 9,449,598 B1 * | 9/2016 | Rastrow | G10L 15/32 | |
| 9,524,718 B2 * | 12/2016 | Obuchi | G10L 15/08 | |
| 9,886,432 B2 * | 2/2018 | Bellegarda | G06F 17/276 | |
| 2002/0049593 A1 * | 4/2002 | Shao | G10L 15/14 | 704/251 |
| 2002/0133340 A1 * | 9/2002 | Basson | G10L 15/22 | 704/235 |
| 2002/0133341 A1 * | 9/2002 | Gillick | G10L 15/32 | 704/235 |
| 2002/0165716 A1 * | 11/2002 | Mangu | G10L 15/08 | 704/255 |
| 2002/0173955 A1 * | 11/2002 | Reich | G10L 15/22 | 704/231 |
| 2002/0177999 A1 * | 11/2002 | Ortega | G10L 15/01 | 704/231 |
| 2002/0184019 A1 * | 12/2002 | Hartley | G10L 15/08 | 704/240 |
| 2003/0018475 A1 * | 1/2003 | Basu | G06K 9/00228 | 704/270 |
| 2003/0046297 A1 * | 3/2003 | Mason | G06F 17/2715 | |
| 2003/0154078 A1 * | 8/2003 | Rees | G10L 15/10 | 704/240 |
| 2003/0187648 A1 * | 10/2003 | Dharanipragada | G10L 15/197 | 704/260 |
| 2004/0015350 A1 * | 1/2004 | Gandhi | G10L 15/01 | 704/235 |
| 2004/0148169 A1 * | 7/2004 | Baker | G10L 15/065 | 704/254 |
| 2005/0033574 A1 * | 2/2005 | Kim | G10L 15/22 | 704/251 |
| 2005/0043948 A1 * | 2/2005 | Kashihara | G10L 15/142 | 704/242 |
| 2005/0049874 A1 * | 3/2005 | Coffman | G06F 17/289 | 704/257 |
| 2005/0125225 A1 * | 6/2005 | Manu | G10L 15/01 | 704/237 |
| 2005/0159950 A1 * | 7/2005 | Roth | G10L 15/22 | 704/236 |
| 2005/0196770 A1 * | 9/2005 | Cox | G06F 19/18 | 435/6.11 |
| 2007/0083374 A1 * | 4/2007 | Bates | G10L 15/197 | 704/257 |
| 2007/0088552 A1 * | 4/2007 | Olsen | G10L 15/08 | 704/256.2 |
| 2007/0094022 A1 * | 4/2007 | Koo | G06K 9/723 | 704/251 |
| 2007/0118374 A1 * | 5/2007 | Wise | G10L 15/26 | 704/235 |
| 2007/0192095 A1 * | 8/2007 | Braho | G10L 15/01 | 704/232 |
| 2008/0154600 A1 * | 6/2008 | Tian | G10L 15/083 | 704/251 |
| 2008/0221890 A1 * | 9/2008 | Kurata | G10L 15/063 | 704/251 |
| 2009/0024392 A1 * | 1/2009 | Koshinaka | G10L 15/06 | 704/257 |
| 2009/0087854 A1 * | 4/2009 | Cox | G06F 19/18 | 435/6.16 |
| 2009/0216740 A1 * | 8/2009 | Ramakrishnan | G06F 17/30681 | |
| 2009/0254501 A1 * | 10/2009 | Song | G06F 17/273 | 706/12 |
| 2010/0145694 A1 * | 6/2010 | Ju | G10L 15/1815 | 704/235 |
| 2010/0250243 A1 * | 9/2010 | Schalk | G10L 15/22 | 704/201 |
| 2011/0054933 A1 * | 3/2011 | Johnson | G06F 19/327 | 705/3 |
| 2011/0087492 A1 * | 4/2011 | Yoshida | G10L 15/08 | 704/240 |
| 2011/0161368 A1 * | 6/2011 | Ishikawa | G06F 17/277 | 707/776 |
| 2011/0224983 A1 * | 9/2011 | Moore | G06F 17/2715 | 704/240 |
| 2013/0138440 A1 * | 5/2013 | Strope | G10L 15/32 | 704/240 |
| 2013/0211822 A1 * | 8/2013 | Sakai | G10L 15/1815 | 704/9 |
| 2013/0317820 A1 * | 11/2013 | Xiao | G10L 15/065 | 704/236 |
| 2014/0012580 A1 * | 1/2014 | Ganong, III | G10L 15/1815 | 704/257 |
| 2014/0012581 A1 * | 1/2014 | Ganong, III | G10L 15/08 | 704/257 |
| 2014/0025380 A1 * | 1/2014 | Koch | G10L 15/1822 | 704/257 |
| 2014/0067394 A1 * | 3/2014 | Abuzeina | G10L 15/144 | 704/244 |
| 2014/0195238 A1 * | 7/2014 | Terao | G10L 15/02 | 704/251 |
| 2014/0222417 A1 * | 8/2014 | Lu | G10L 15/063 | 704/9 |
| 2014/0236579 A1 * | 8/2014 | Kurz | G06F 17/28 | 704/9 |
| 2014/0358539 A1 * | 12/2014 | Rao | G10L 15/063 | 704/243 |
| 2014/0358544 A1 * | 12/2014 | Printz | G10L 15/19 | 704/254 |
| 2015/0051902 A1 * | 2/2015 | Bodenstab | G06F 17/27 | 704/9 |
| 2015/0066507 A1 * | 3/2015 | Nakamura | G10L 25/51 | 704/240 |
| 2015/0088506 A1 * | 3/2015 | Obuchi | G10L 15/08 | 704/236 |
| 2015/0160855 A1 * | 6/2015 | Bi | G06F 3/04886 | 715/773 |

(56) References Cited

U.S. PATENT DOCUMENTS

| | | | | |
|---|---|---|---|---|
| 2015/0169971 A1* | 6/2015 | Cummins | ............... | G06F 17/20 382/182 |
| 2015/0325235 A1* | 11/2015 | Levit | ...................... | G10L 15/18 704/257 |
| 2015/0348541 A1* | 12/2015 | Epstein | ................. | G10L 15/063 704/257 |
| 2015/0348547 A1* | 12/2015 | Paulik | ..................... | G10L 15/19 704/251 |
| 2016/0093294 A1* | 3/2016 | Kapralova | ............ | G10L 15/063 704/232 |
| 2016/0093301 A1* | 3/2016 | Bellegarda | ............ | G06F 17/276 704/9 |
| 2016/0133250 A1* | 5/2016 | Czahor | ................... | G10L 15/19 704/257 |
| 2016/0133253 A1* | 5/2016 | Braho | ..................... | G10L 15/22 704/251 |
| 2016/0259779 A1* | 9/2016 | Labsk | ..................... | G10L 15/18 |
| 2016/0275050 A1* | 9/2016 | Tanaka | .................. | G06F 17/212 |
| 2016/0284349 A1* | 9/2016 | Ravindran | .............. | G10L 15/20 |
| 2017/0270912 A1* | 9/2017 | Levit | ...................... | G10L 15/063 |
| 2017/0301350 A1* | 10/2017 | Mengibar | .......... | G06Q 30/0277 |
| 2017/0309276 A1* | 10/2017 | Yeracaris | ................ | G10L 17/10 |

\* cited by examiner

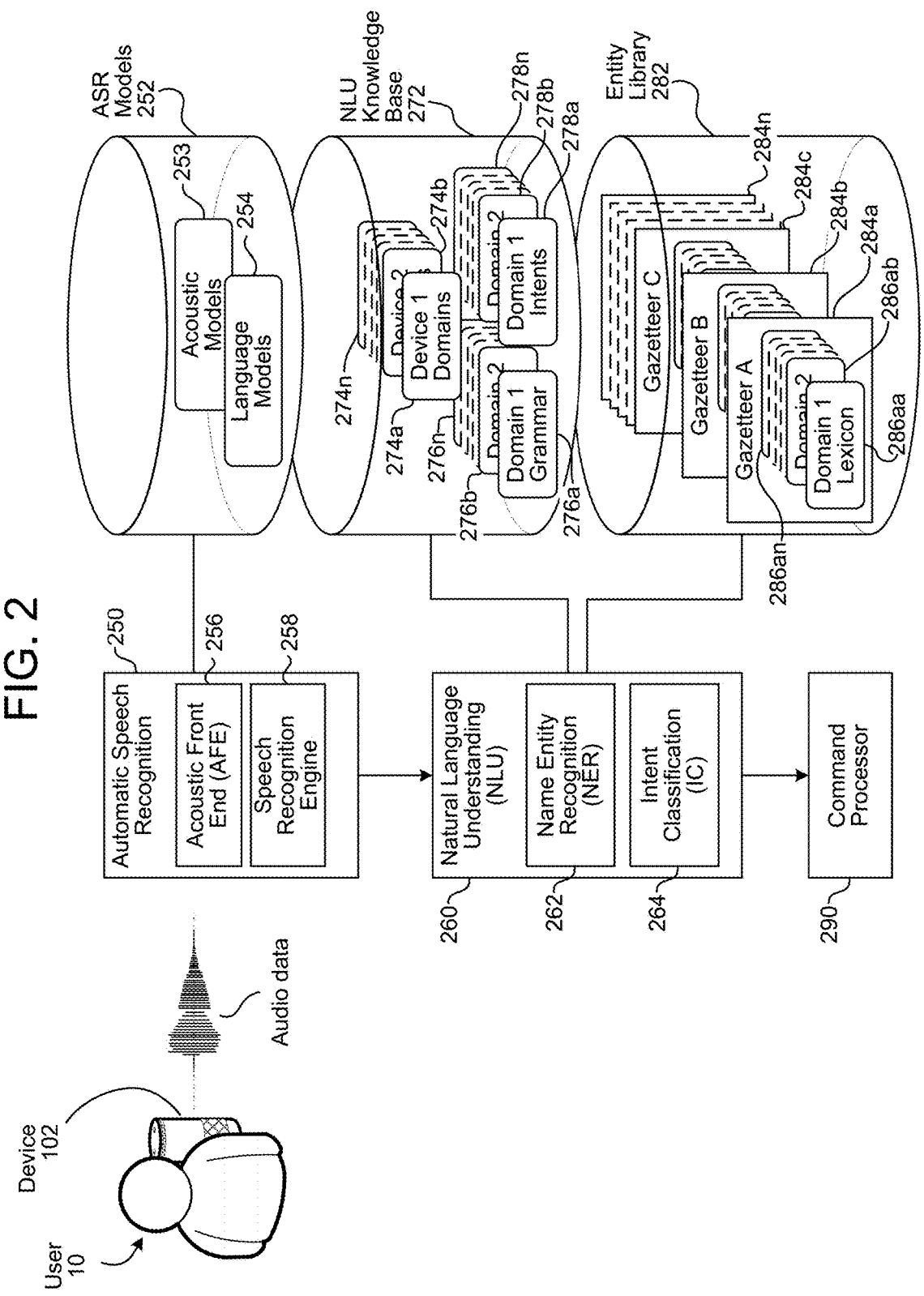

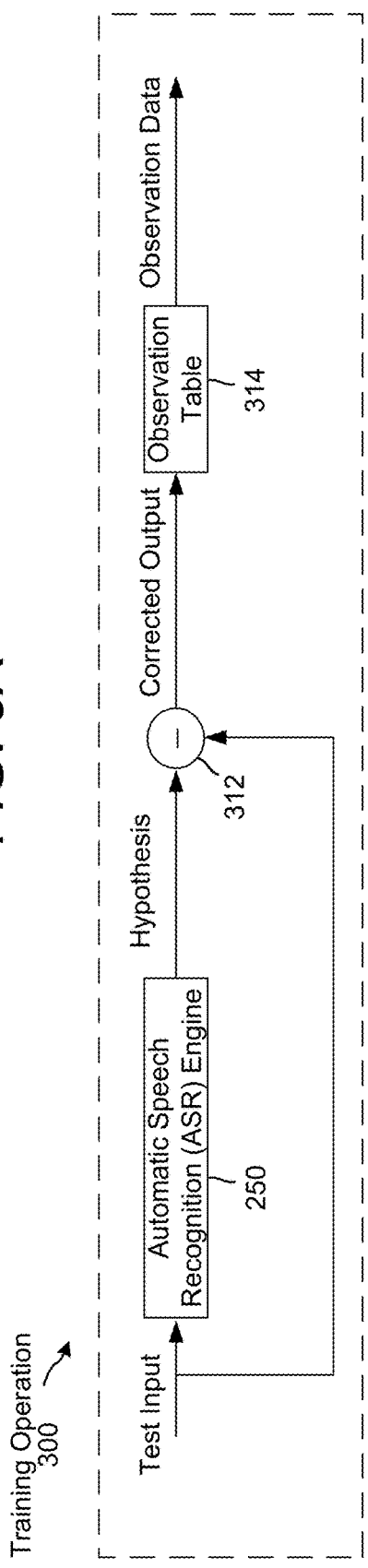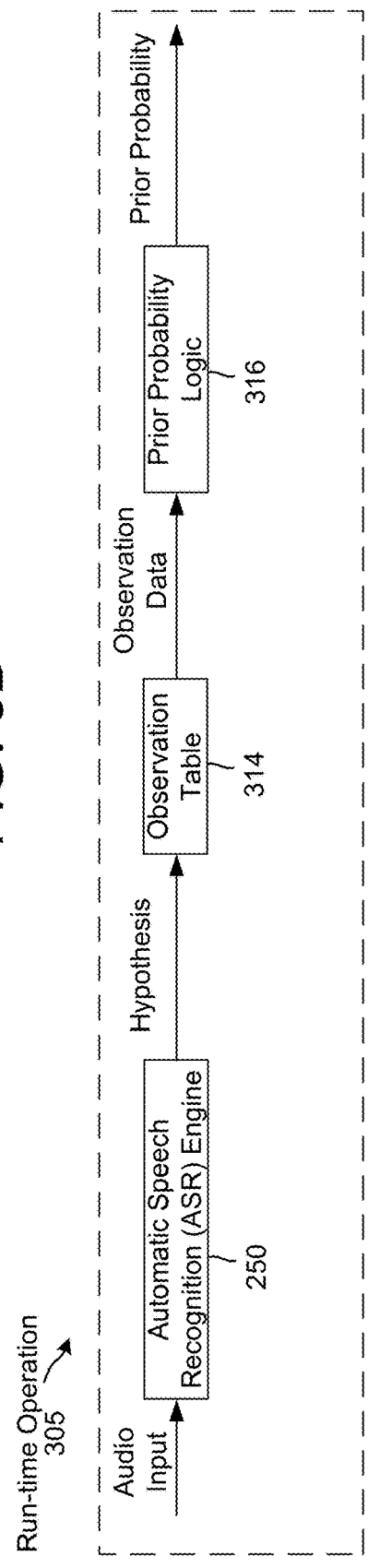

FIG. 6

| Word | Observed | Correct | Percent |
|---|---|---|---|
| [Frequent Word] | 100 | 90 | 90% |

610

| Prior Probability |
|---|
| 90% |

612

| Word | Observed | Correct | Percent |
|---|---|---|---|
| [Occasional Word] | 20 | 18 | 90% |

620

| Prior Probability |
|---|
| 90% |

622

| Word | Observed | Correct | Percent |
|---|---|---|---|
| [Infrequent Word] | 3 | 2 | 66% |

630

| Prior Probability |
|---|
| 66% |

632

| Word | Observed | Correct | Percent |
|---|---|---|---|
| [New Word] | 0 | 0 | N/A |

640

| Prior Probability |
|---|
| 0% |

| Word | Observed | Correct | Percent |
|---|---|---|---|
| [Infrequent Word] | 3 | 3 | 100% |

710

| Prior Probability |
|---|
| 100% |

712

| Word | Observed | Correct | Percent |
|---|---|---|---|
| [Infrequent Word] | 3 | 2 | 66% |

720

| Prior Probability |
|---|
| 66% |

722

| Word | Observed | Correct | Percent |
|---|---|---|---|
| [Infrequent Word] | 3 | 1 | 33% |

730

| Prior Probability |
|---|
| 33% |

732

| Word | Observed | Correct | Percent |
|---|---|---|---|
| [Infrequent Word] | 3 | 0 | 0% |

740

| Prior Probability |
|---|
| 0% |

| Word | Observed | Correct | Percent |
|---|---|---|---|
| Infrequent Word 11 | 1 | 0 | 0% |
| Infrequent Word 12 | 1 | 1 | 100% |
| Infrequent Word 13 | 1 | 1 | 100% |
| Infrequent Word 14 | 1 | 0 | 0% |
| Infrequent Word 15 | 1 | 1 | 100% |
| Sum for Frequency 1 | 5 | 3 | 60% |

810 / 816

Group Prior Probability 60% — 818

| Word | Observed | Correct | Percent |
|---|---|---|---|
| Infrequent Word 21 | 2 | 0 | 0% |
| Infrequent Word 22 | 2 | 2 | 100% |
| Infrequent Word 23 | 2 | 2 | 100% |
| Infrequent Word 24 | 2 | 1 | 50% |
| Infrequent Word 25 | 2 | 1 | 50% |
| Sum for Frequency 2 | 10 | 6 | 60% |

820 / 826

Group Prior Probability 60% — 828

| Word | Observed | Correct | Percent |
|---|---|---|---|
| Infrequent Word 31 | 3 | 0 | 0% |
| Infrequent Word 32 | 3 | 3 | 100% |
| Infrequent Word 33 | 3 | 3 | 100% |
| Infrequent Word 34 | 3 | 2 | 66% |
| Infrequent Word 35 | 3 | 1 | 33% |
| Sum for Frequency 3 | 15 | 9 | 60% |

830 / 836

Group Prior Probability 60% — 838

| Word | Observed | Correct | Percent |
|---|---|---|---|
| Infrequent Word 41 | 3 | 3 | 100% |
| Infrequent Word 42 | 1 | 1 | 100% |
| Infrequent Word 43 | 2 | 1 | 50% |
| Infrequent Word 44 | 3 | 1 | 33% |
| Infrequent Word 45 | 1 | 0 | 0% |
| Sum for Infrequent | 10 | 6 | 60% |

840 / 846

Group Prior Probability 60% — 848

FIG. 10

Observation Table 1010

| Word | Observed | Correct | Percent |
|---|---|---|---|
| Play | 75 | 70 | 93% |
| I've | 30 | 25 | 83% |
| Got | 3 | 1 | 33% |
| A | 100 | 96 | 96% |
| Feeling | 8 | 6 | 75% |
| By | 13 | 10 | 77% |
| The | 82 | 72 | 88% |
| Black | 5 | 3 | 60% |
| Eyed | 21 | 15 | 71% |
| Peas | 1 | 0 | 0% |
| | | | |
| Sum for Frequency 1 | 43 | 27 | 62% |
| Sum for Frequency 2 | 68 | 43 | 63% |
| Sum for Frequency 3 | 95 | 62 | 65% |

Predicted Word 1012

Group Prior Probability 1014

"Play  I've  Got  A  Feeling  By  The  Black  Eyed Peas" — Hypothesis 1020

93%  83%  65%  96%  75%  77%  88%  60%  71%  62% — Prior Probabilities 1022

Estimated Prior Probability 1024

FIG. 12

Observation Table 1210

| Word | Observed | Correct | Percent |
|---|---|---|---|
| Play | 75 | 70 | 93% |
| I've | 30 | 25 | 83% |
| Got | 3 | 1 | 33% |
| A | 100 | 96 | 96% |
| Feeling | 8 | 6 | 75% |
| By | 13 | 10 | 77% |
| The | 82 | 72 | 88% |
| Black | 5 | 3 | 60% |
| Eyed | 21 | 15 | 71% |
| Peas | 0 | 0 | 0% |
| Sum for Frequency 1 | 43 | 27 | 62% |
| Sum for Frequency 2 | 68 | 43 | 63% |
| Sum for Frequency 3 | 95 | 62 | 65% |

Predicted Word 1212

Group Prior Probability 1214

"Play   I've   Got   A   Feeling   By   The   Black   Eyed  Peas" —Hypothesis 1220

93%    83%   65%  96%   75%    77%  88%   60%    71%   62% —Prior Probabilities 1222

Estimated Prior Probability 1224

FIG. 16

| Word | Observed | Correct | Percent |
|---|---|---|---|
| [Infrequent Word] | 3 | 1 | 33% |
| Sum for Frequency 3 | 95 | 62 | 65% |

1610 / 1612

Estimated Prior Probability

65%

1614

| Word | Observed | Correct | Percent |
|---|---|---|---|
| [Infrequent Word] | 4 | 2 | 50% |
| Sum for Frequency 4 | 130 | 93 | 71% |

1620 / 1622

Estimated Prior Probability

71%

1624

| Word | Observed | Correct | Percent |
|---|---|---|---|
| [Infrequent Word] | 5 | 3 | 60% |
| Sum for Frequency 5 | 157 | 109 | 69% |

1630 / 1632

Estimated Prior Probability

69%

1634

| Word | Observed | Correct | Percent |
|---|---|---|---|
| [Infrequent Word] | 6 | 4 | 66% |
| Sum for Frequency 6 | 193 | 141 | 73% |

1640 / 1642

Estimated Prior Probability

| Word | Observed | Correct | Percent |
|---|---|---|---|
| [Infrequent Word] | 3 | 1 | 33% |
| Sum for Frequency 3 | 95 | 62 | 65% |

1810

| Estimated Prior Probability |
|---|
| 57% |

1814

Weight: 25% Individual Prior Probability, 75% Group Prior Probability 0.25(33%) + 0.75(65%) = 57% — 1812

| Word | Observed | Correct | Percent |
|---|---|---|---|
| [Infrequent Word] | 4 | 2 | 50% |
| Sum for Frequency 4 | 130 | 93 | 71% |

1820

| Estimated Prior Probability |
|---|
| 60.5% |

1824

Weight: 50% Individual Prior Probability, 50% Group Prior Probability 0.5(50%) + 0.5(71%) = 60.5% — 1822

| Word | Observed | Correct | Percent |
|---|---|---|---|
| [Infrequent Word] | 5 | 3 | 60% |
| Sum for Frequency 5 | 157 | 109 | 71% |

1830

| Estimated Prior Probability |
|---|
| 62.75% |

1834

Weight: 75% Individual Prior Probability, 25% Group Prior Probability 0.75(60%) + 0.25(71%) = 62.75% — 1832

| Word | Observed | Correct | Percent |
|---|---|---|---|
| [Infrequent Word] | 6 | 4 | 66% |
| Sum for Frequency 6 | 194 | 140 | 72% |

1840

| Estimated Prior Probability |
|---|
| 66% |

1844

Weight: 100% Individual Prior Probability, 0% Group Prior Probability 1.0(66%) + 0.0(72%) = 66% — 1842

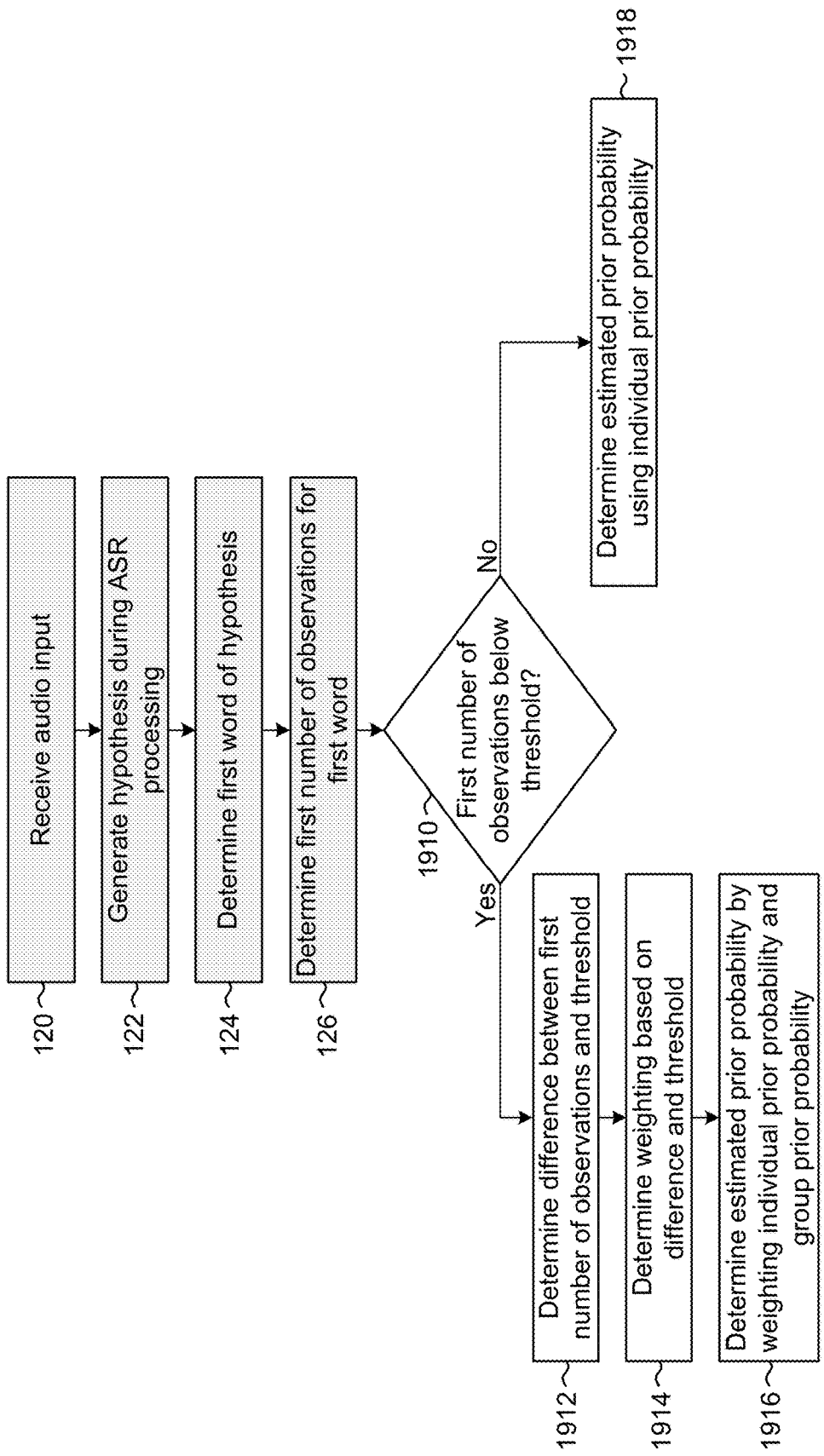

CONFIDENCE ESTIMATION BASED ON FREQUENCY

BACKGROUND

Speech recognition systems have progressed to the point where humans can interact with computing devices entirely relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is commonly referred to as speech processing. Speech processing may also convert a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 2 is a conceptual diagram of how an utterance may be processed according to embodiments of the present disclosure.

FIGS. 3A-3B illustrate example system diagrams for performing a training operation and a run-time operation according to embodiments of the present disclosure.

FIG. 6 illustrates an example of differentiating words based on a frequency of observation.

FIG. 7 illustrates an example of a variation in prior probabilities for an infrequently observed word.

FIG. 8 illustrates examples of grouping words having similar observation frequencies to determine group prior probabilities according to embodiments of the present disclosure.

FIG. 10 illustrates an example of using a group prior probability for an infrequently observed word according to embodiments of the present disclosure.

FIG. 12 illustrates an example of using a group prior probability for previously unencountered vocabulary according to embodiments of the present disclosure.

FIG. 16 illustrates an example of using group prior probabilities for an infrequently observed word until observations exceed a threshold according to embodiments of the present disclosure.

FIG. 18 illustrates an example of determining a weighted estimated prior probability until observations exceed a threshold according to embodiments of the present disclosure.

FIG. 19 is a flowchart conceptually illustrating an example method for determining a weighted estimated prior probability until observations exceed a threshold according to embodiments of the present disclosure.

DETAILED DESCRIPTION

Figure 1:
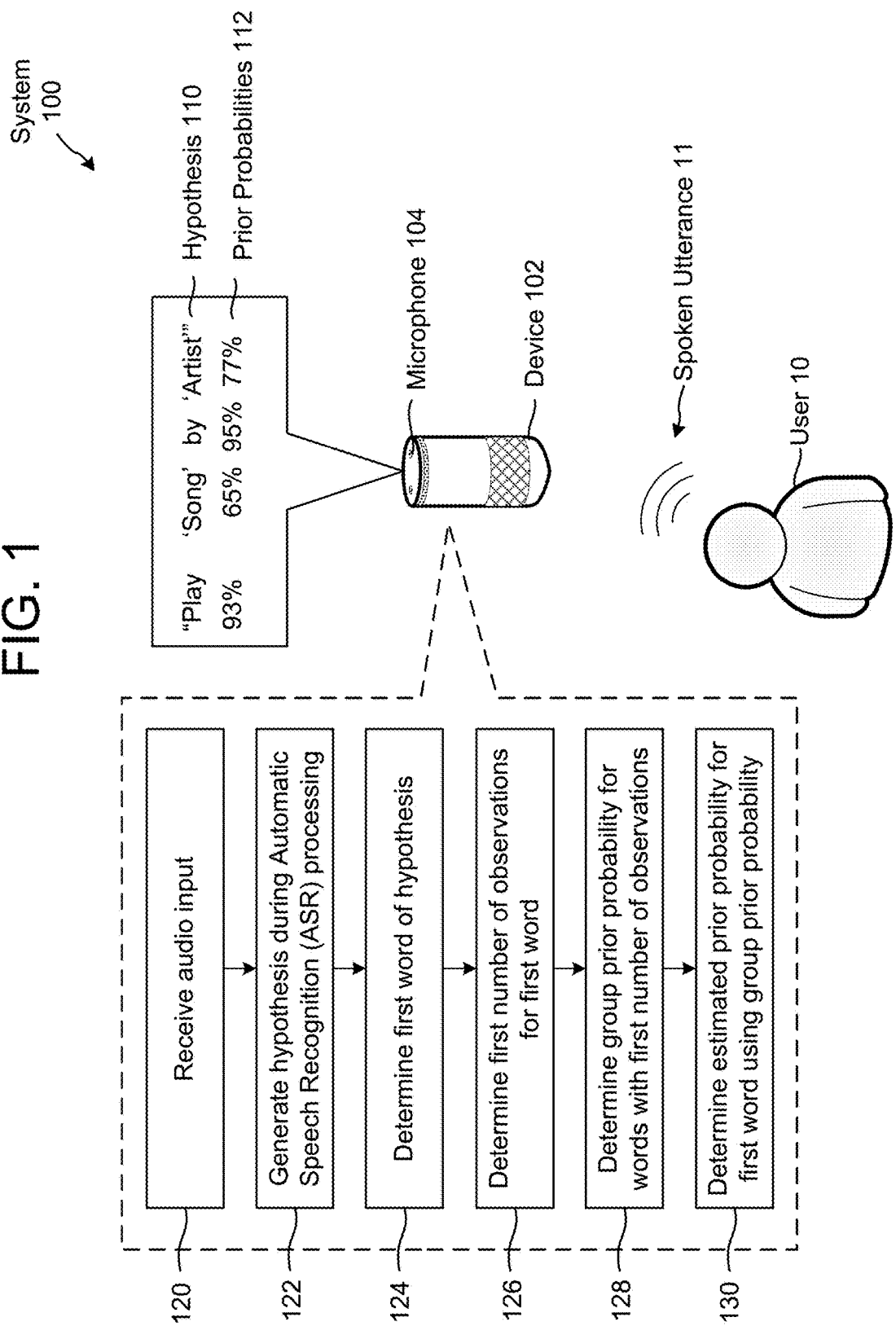
FIG. 1 illustrates an overview of a system for determining prior probabilities associated with Automatic Speech Recognition (ASR) according to embodiments of the present disclosure.

Automatic speech recognition (ASR) is a field of computer science, artificial intelligence, and linguistics concerned with transforming audio data associated with speech into text representative of that speech. For example, a device may receive an utterance as an audio input and perform ASR to generate a textual prediction of the audio input. The device may use the textual prediction to perform an action, such as initiating a process or performing a function as instructed by the audio input. However, an accuracy of the ASR processing varies and the textual prediction may not match the audio input. Prior to performing the action, the device may estimate a confidence that individual words included in the textual prediction are recognized correctly by the ASR processing.

To estimate the confidence that a particular word included in the textual prediction (hypothesis) is correct, the device may determine a prior probability associated with the particular word based at least in part on how often that particular word was correct when recognized during previous ASR processing, such as in a separate large training set during a testing phase of ASR training or during previous run-time operation. For example, the device may determine a number of correct predictions (e.g., number of correct results) and a total number of predictions (e.g., number of observations) for the particular word in the previous ASR processing. The device may determine the prior probability by dividing the number of correct results by the number of observations for the particular word. However, words that appear infrequently are problematic because they have 'noisy' probabilities that may vary from the true probability due to a lack of observed examples.

Infrequent words may not be modeled well by a language model and may have highly correlated error rates, with those error rates decreasing as the number of observations of a word increases. Therefore, to improve an estimation of prior probabilities for utterances, devices, systems and methods are disclosed that take into account a number of observations (e.g., frequency of predictions in previous ASR processing, based on the large training set and/or previous run-time operation) of a particular word and may determine an estimated prior probability based on a group prior probability for words having a similar number of observations. For example, if the particular word was observed only three times, rather than assigning the particular word a prior probability of 0%, 33%, 67% or 100%, an estimated prior probability may be determined by combining a number of correct results and a number of observations for a group of words that were observed three times and calculating a group prior probability for the group. Further, an estimated prior probability may be determined for a word that was not previously observed by determining a group prior probability for a group of words that have been observed once. The estimated prior probability for a particular word may be determined differently as the number of observations increases and may transition from the group prior probability to an individual prior probability when the number of observations exceeds a threshold.

FIG. 1 illustrates an overview of a system 100 for implementing embodiments of the disclosure. The system 100 includes a device 102 coupled to a microphone 104. As illustrated in FIG. 1, the device 102 may receive an utterance 11 from a user 10 using the microphone 104, may perform Automatic Speech Recognition (ASR) on the utterance 11 to generate a hypothesis 110 and may determine prior probabilities 112 for individual words (e.g., tokens) in the hypothesis 110. The hypothesis 110 may be determined from a lattice of words (using a language model) or sounds (using an acoustic model). Alternatively, audio captured by device 102 may be sent to a remote device for ASR processing. Although the description below may use a single processing device as an example, the methods and operations described may be performed by a single local device, a remote device, or a combination of multiple devices.

A user 10 may speak an utterance 11 including a command. The user's utterance may be captured by the microphone 104 as an audio input. The device 102 may receive (120) the audio input corresponding to the utterance, for example as a result of the microphone 104 converting the sound to an audio data signal. The device 102 may generate (122) a hypothesis during ASR processing on the audio input, for example using techniques described below with regard to FIG. 2.

The device 102 may determine (124) a first word (also referred to as a token) of the hypothesis and may determine (126) a first number of observations for the first word using previous observation data. The previous observation data may include data from a testing phase of ASR training, such as when a large training set of data is input for ASR processing and the output evaluated to determine a number of total observations (e.g., number of predictions within the training set of data) and a number of correct results associated with the first word. Additionally or alternatively, the previous observation data may include data from previous ASR processing, such as when the previous ASR processing is evaluated based on user feedback to determine a number of observations and a number of correct results associated with the first word during the previous ASR processing. For example, the device 102 may identify the first word from the hypothesis 110 and may use a lookup table (e.g., an observation table including results from ASR training, ASR testing and/or previous ASR processing) or other resource to determine a frequency that the first word was observed previous to current ASR processing.

When the number of observations for the first word is below a threshold, a prior probability (e.g., a number of correct predictions out of a total number of observations) may be an unreliable indicator that the device 102 correctly predicted the first word. This unreliability may stem from the fact that the word is not frequently encountered, thus minor variations in the correct predictions may result in major variations in the prior probability (and therefore major variations in a confidence score generated using the prior probability). For example, if the first word has been observed three times, a single incorrect result may vary the prior probability by 33%. Therefore, to improve an estimation of a prior probability for the first word (e.g., an estimation that the first word was correctly predicted by the device 102 based on past results), the device 102 may determine (128) a group prior probability for words with the first number of observations. For example, the device 102 may combine observation data for a group of words having the first number of observations and determine a group prior probability of the group as a whole (e.g., the total number of correct predictions divided by the total number of observations).

The device 102 may determine (130) an estimated prior probability for the first word using the group prior probability. For example, the device 102 may determine the estimated prior probability for the first word to be equal to the group prior probability. However, the disclosure is not limited thereto and the device 102 may determine the estimated prior probability for the first word using a weighted average of an individual prior probability and the group prior probability, as discussed in greater detail below.

While FIG. 1 illustrates the device 102 determining the group prior probability during/after ASR processing on the first word, the present disclosure is not limited thereto. Instead, the device 102 (or a separate device, such as a server or the like) may determine a plurality of group prior probabilities prior to ASR processing that the device 102 may use during the ASR processing. For example, the device 102 may calculate individual group prior probabilities for a plurality of groups and store the individual group prior probabilities in a lookup table or the like. Thus, the device 102 may calculate a first group prior probability for a first plurality of words having one observation, a second group prior probability for a second plurality of words having two observations, a third group prior probability for a third plurality of words having between one and three observations, a fourth group prior probability for a fourth plurality of words having a language frequency below a threshold and/or the like. In some examples, the device 102 may replace individual prior probabilities for words having a number of observations below a threshold with a corresponding group prior probability in the previous observation data. For example, a first group prior probability may be substituted for each of the individual prior probabilities associated with a first group of words. In other examples, the device 102 may generate a group prior probability lookup table and may determine during ASR processing whether to use an individual prior probability associated with a first word or to use a group prior probability for the first word. For example, the device 102 may determine that a number of observations associated with the first word is below a threshold and may refer to the lookup table to determine the group prior probability corresponding to the number of observations. The observation data may be updated periodically by the device 102 or a remote device (e.g., a server). For example, the remote device may update the observation data and the device 102 may receive and use the updated observation data during ASR processing.

The system 100 of FIG. 1 may operate using various speech processing components as described in FIG. 2. FIG. 2 is a conceptual diagram of how an utterance is processed. The various components illustrated may be located on a same or different physical devices. Communication between various components illustrated in FIG. 2 may occur directly or across a network. An audio capture component, such as a microphone 104, captures audio corresponding to an utterance 11. An ASR process 250 converts the audio into text. The ASR transcribes audio data into text data representing the words of the speech contained in the audio data. The text data may then be used by other components for various purposes, such as executing system commands, inputting data, etc. An utterance in the audio data is input to a processor configured to perform ASR which then interprets the utterance based on the similarity between the utterance and pre-established language models 254 stored in an ASR model knowledge base (ASR Models Storage 252). For example, the ASR process may compare the input audio data with models for sounds (e.g., subword units or phonemes) and sequences of sounds to identify words that match the sequence of sounds spoken in the utterance of the audio data.

The different ways an utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR process 250 may include an acoustic front end (AFE) 256 and a speech recognition engine 258. The acoustic front end (AFE) 256 transforms the audio data from the microphone into data for processing by the speech recognition engine. The speech recognition engine 258 compares the speech recognition data with acoustic models 253, language models 254, and other data models and information for recognizing the speech conveyed in the audio data. The AFE may reduce noise in the audio data and divide the digitized audio data into frames representing a time intervals for which the AFE determines a set of values, called a feature vector, representing the features/qualities of the utterance portion within the frame. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 258 may process the output from the AFE 256 with reference to information stored in speech/model storage (252). Alternatively, post front-end processed data (such as feature vectors) may be received by the device executing ASR processing from another source besides the internal AFE. For example, the device 102 may process audio data into feature vectors and transmit that information to a server across a network for ASR processing. Feature vectors may arrive at the server encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s). For example, ASR results in the form of a single textual representation of the speech, an N-best list including multiple hypotheses and respective scores, lattice, etc. may be sent to a server for natural language understanding (NLU) processing, such as conversion of the text into commands for execution, either by the device 102, by the server, or by another device.

The device performing NLU processing 260 may include various components, including potentially dedicated processor(s), memory, storage, etc. A device configured for NLU processing may include a named entity recognition (NER) module 252 and intent classification (IC) module 264, a result ranking and distribution module 266, and knowledge base 272. The NLU process may also utilize gazetteer information (284a-284n) stored in entity library storage 282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process takes textual input (such as processed from ASR 250 based on the utterance 11) and attempts to make a semantic interpretation of the text. That is, the NLU process determines the meaning behind the text based on the individual words and then implements that meaning. NLU processing 260 interprets a text string to derive an intent or a desired action from the user as well as the pertinent pieces of information in the text that allow a device (e.g., device 102) to complete that action. For example, if an utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

As will be discussed further below, the NLU process may be configured to parsed and tagged to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 260 may be configured to determine a "domain" of the utterance so as to determine and narrow down which services offered by the endpoint device (e.g., device 102) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 262 receives a query in the form of ASR results and attempts to identify relevant grammars and lexical information that may be used to construe meaning. To do so, a name entity recognition module 262 may begin by identifying potential domains that may relate to the received query. The NLU knowledge base 272 includes a databases of devices (274a-274n) identifying domains associated with specific devices. For example, the device 102 may be associated with domains for music, telephony, calendaring, contact lists, and device-specific communications, but not video. In addition, the entity library may include database entries about specific services on a specific device, either indexed by Device ID, User ID, or Household ID, or some other indicator.

A domain may represent a discrete set of activities having a common theme, such as "shopping", "music", "calendaring", etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

A query is processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification (IC) module 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 260 may parse the query to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrase relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the a slot/field using gazetteer information, the NER module 262 may search the database of generic words associated with the domain (in the NLU's knowledge base 272). So for instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried, potentially producing two different results.

The comparison process used by the NER module 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER modules 262 may also use contextual operational rules to fill slots. For example, if a user had previously requested to pause a particular song and thereafter requested that the voice-controlled device to "please un-pause my music," the NER module 262 may apply an inference-based rule to fill a slot associated with the name of the song that the user currently wishes to play—namely the song that was playing at the time that the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server. The destination command processor 290 may be determined based on the NLU output. For example, if the NLU output includes a command to play music, the destination command processor 290 may be a music playing application, such as one located on device 102 or in a music playing appliance, configured to execute a music playing command. If the NLU output includes a search request, the destination command processor 290 may include a search engine processor, such as one located on a search server, configured to execute a search command.

FIG. 3A illustrates an example system diagram for performing a training operation 300. For example, the device 102 may receive a test input and ASR processing on the test input using an ASR engine 250 to generate a hypothesis (e.g., predicted text). The device 102 may compare the hypothesis to the test input using a difference block 312 to determine a corrected output. For example, as this is a training scenario, the device 102 may receive both audio and text associated with the test input and may compare the text associated with the test input to the hypothesis to determine differences between the hypothesis and the test input. Thus, the device 102 may determine that a first word appeared in the hypothesis x number of times (e.g., there were x observations of the first word) and that the hypothesis correctly predicted the first word y times (e.g., there were y correct results), where x and y are natural numbers.

The device 102 may store the corrected output in an observation table 316. Thus, the device 102 may use the observation table 316 as a lookup table to retrieve observation data, which may include a number of observations, a number of correct results and a percentage of correct results (hereinafter, "prior probability"). For example, if the observation table 316 lists 20 observations of the first word with 18 correct results, the prior probability would be 90%. Using the training operation 300 as an indicator of future performance, the device 102 may use the 90% prior probability to determine that the device 102 has a 90% likelihood that the first word is correctly predicted when the ASR engine 250 predicts the first word.

FIG. 3B illustrates an example system diagram for performing a run-time operation 305, that is an operation when a device is configured and operating to perform ASR processing on input user utterances (rather than training utterances). During the run-time operation 305, the device 102 may receive an audio input and may use the ASR engine 250 to generate a hypothesis (e.g., predicted text). The device 102 may retrieve observation data associated with the hypothesis from the observation table 314 and may determine a prior probability using prior probability logic 316. For example, the device 102 may identify the first word in the hypothesis and may retrieve observation data associated with the first word to determine that a prior probability associated with the first word is 90%. As will be discussed in greater detail below, the prior probability logic 316 may perform additional steps to determine the prior probability associated with the first word. The run-time operation 305 may output the hypothesis and associated prior probabilities.

Figure 4A:
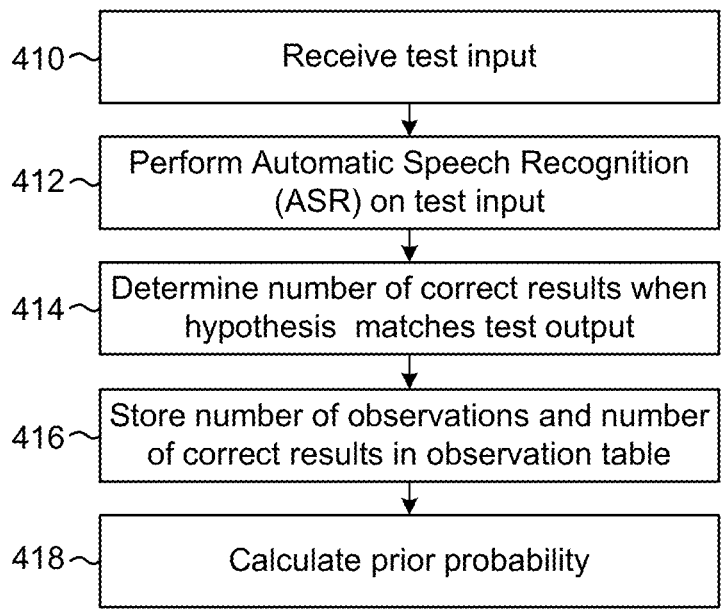
FIGS. 4A-4B are flowcharts conceptually illustrating example methods for performing a training operation and a run-time operation according to embodiments of the present disclosure.

FIG. 4A is a flowchart conceptually illustrating an example method for performing the training operation 300. For example, the device 102 may receive (410) a test input, may perform (412) ASR on the test input to generate the hypothesis, may determine (414) a number of correct results when the hypothesis matches the test input and may store (416) the number of observations and the number of correct results in an observation table. For example, the device 102 may determine that a first word has a first number of observations in the hypothesis. By comparing the hypothesis to the test input, such as text associated with the test input, the device 102 may determine that the hypothesis includes a second number of correct results. The device 102 may then store the first number and the second number along with the first word in an observation table.

Figure 4B:
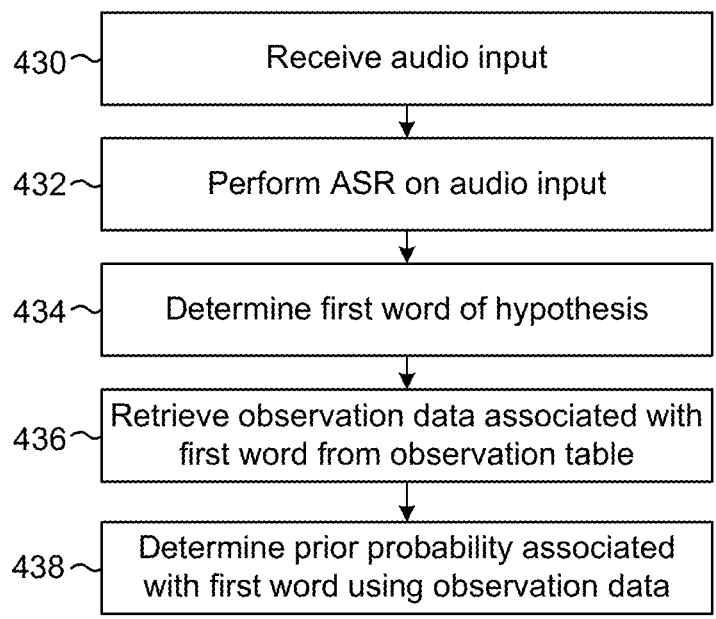

FIG. 4B is a flowchart conceptually illustrating an example method for performing the run-time operation 305. For example, the device 102 may receive (430) an audio input, may perform (432) ASR on the audio input to generate a hypothesis, may determine (434) a first word of the hypothesis, may retrieve (436) observation data associated with the first word from the observation table and may determine (438) a prior probability associated with the first word using the observation data. For example, the device 102 may retrieve observation data associated with the first word that includes a first number of observations and a second number of correct results. If the first number of observations exceeds a threshold, the device 102 may determine the prior probability by determining an individual prior probability (e.g., divide the second number by the first number) prior probability. If the first number of observations is below the threshold, the device 102 may determine the prior probability by determining a group prior probability for words with the first number of observations, as described in greater detail below.

Figure 5:
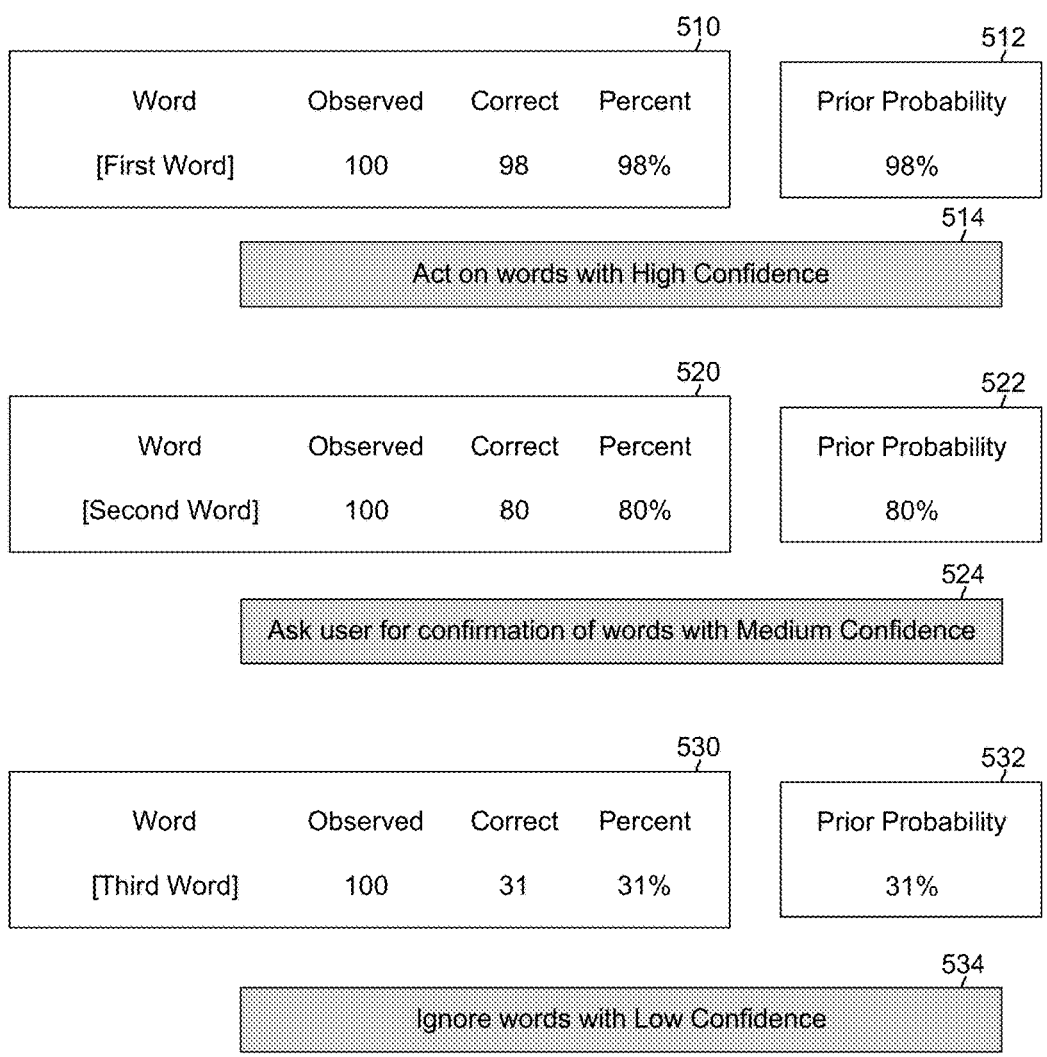
FIG. 5 illustrates examples of outcomes associated with confidence levels.

How the device 102 proceeds after predicting a word is determined based on the prior probability associated with the word. FIG. 5 illustrates a first table 510, which includes a first word that was observed 100 times (e.g., predicted 100 times), with 98 correct results (e.g., correctly predicted 98 times) resulting in a prior probability of 98%. As the 100 observations exceeds a threshold, the device 102 may determine a prior probability 512 associated with the first word to be 98%. Using the prior probability to generate a prior probability, the device 102 may have a High Confidence that the first word is accurately predicted, and the device 102 acts on words with a High Confidence. For example, if the first word is "play," the device 102 may determine that "play" is a command to begin playback of audio and may load a music application and determine which music track to play.

A second table 520 includes a second word that was observed 100 times, with 80 correct results resulting in a prior probability of 80%. As the 100 observations exceeds the threshold, the device 102 may determine a prior probability 522 associated with the second word to be 80%. Using the prior probability to generate a prior probability, the device 102 may have a Medium Confidence that the second word is accurately predicted, and the device 102 asks the user 10 for confirmation of words with a Medium Confidence before proceeding. For example, if the second word is "Call," the device 102 may prompt the user 10 to confirm that the second word was in fact "call." If the device 102 receives an input confirming that the second word was intended to be "call," the device 102 may determine that "call" is a command to communicate to a remote device and may load a telephone application and determine which contact to call.

A third table 530 includes a third word that was observed 100 times, with 31 correct results resulting in a prior probability of 31%. As the 100 observations exceeds the threshold, the device 102 may determine a prior probability 532 associated with the third word to be 31%. Using the prior probability to generate a prior probability, the device 102 may have a Low Confidence that the third word is accurately predicted and the device 102 may ignore the third word, or may take other actions. For example, the device 102 may continue current processing or may notify the user 10 that the third word was not recognized.

A prior probability associated with a word is a reliable indicator that the device 102 may correctly predict the word only when the word has been observed a sufficient number of times. For example, FIG. 6 illustrates examples of a frequent word (shown in table 610), an occasional word (shown in table 620), an infrequent word (shown in table 630) and a new word to be added to the vocabulary (shown in table 630), which has not been predicted by the device 102 previously.

The device 102 has observed the frequent word 100 times, with 90 correct results resulting in a prior probability of 90% and therefore a prior probability 612 of 90%. The device 102 has observed the occasional word 20 times, with 18 correct results resulting in a prior probability of 90% and therefore a prior probability 622 of 90%. The device 102 has observed the infrequent word only three times, with two correct results resulting in a prior probability of 66% and therefore a prior probability 632 of 66%. The device 102 has not observed the new word, with zero observations, zero correct results and a prior probability 642 of 0%.

When the device 102 has observed a word infrequently, minor variations in correct results may result in major variations in a prior probability (and therefore major variations in a confidence score generated using the prior probability). For example, when a word has been observed three times, a single incorrect result may vary the prior probability by 33%. Therefore, the prior probability is an unreliable indicator that the device 102 may correctly predict an infrequent word. FIG. 7 illustrates an example of minor variations in correct results causing major variations in the prior probability.

As illustrated in FIG. 7, an infrequent word that has been observed three times may have one of four prior probabilities. For example, table 710 shows three correct results resulting in a prior probability 712 of 100%, table 720 shows two correct results resulting in a prior probability 722 of 66%, table 730 shows one correct result resulting in a prior probability 732 of 33% and table 740 shows zero correct results resulting in a prior probability 742 of 0%. While the prior probability associated with the infrequent word may vary between 0% and 100%, this is an unreliable indicator that the device 102 may correctly predict the infrequent word in the future.

To avoid using an unreliable indicator such as a prior probability for infrequent words, the device 102 may determine prior probabilities differently for words having a number of observations below a threshold. The threshold may be based on an amount of variation per observation, a size of the training data, an average number of observations within the observation table, user preferences for how frequently the device 102 should prompt the user 10 for confirmation and/or the like. For example, using the amount of variation per observation to reduce variations in the prior probability based on minor variations in correct results, the threshold may vary between five and twenty. When the threshold is set to five, a single incorrect result may vary the prior probability by 20%, whereas when the threshold is set to twenty, a single incorrect result may vary the prior probability by 5%. Thus, a reasonable threshold may be ten observations, with a single incorrect result varying the prior probability by 10%.

The device 102 categorizes a word as an "infrequent word" when a number of observations associated with the word in the observation data is below the threshold. Infrequent words are also infrequent in the language models used by the device 102 and are unusual words that the device 102 is less likely to correctly predict. In addition, words that have been seen a similar number of times by the device 102 have a similar probability of being identified correctly. Therefore, to generate a more reliable indicator that the device 102 may correctly predict an infrequent word in the future, the device 102 may combine observation data from multiple infrequent words to determine a estimated prior probability.

FIG. 8 illustrates examples of grouping words having similar observation frequencies to determine group prior probabilities according to embodiments of the present disclosure. As illustrated in FIG. 8, a first table 810 may combine observation data for words that the device 102 has observed one time, a second table 820 may combine observation data for words that the device 102 has observed twice, and a third table 830 may combine observation data for words that the device 102 has observed three times. However, the disclosure is not limited thereto, and the device 102 may combine observation data for words having a range of frequencies, as illustrated by a fourth table 840 including words that were observed between one and three times by the device 102.

The first table 810 illustrates observation data being combined in a first group 816 for words that were observed by the device 102 once. In contrast to the individual prior probabilities (e.g., 0% or 100%), the first group 816 as a whole had a group prior probability 818 of 60%. Similarly, the second table 820 illustrates observation data being combined in a second group 826 for words that were observed by the device 102 twice. In contrast to the individual prior probabilities (e.g., 0%, 50% or 100%), the second group 826 as a whole had a group prior probability 828 of 60%. The third table 830 illustrates observation data being combined in a third group 836 for words that were observed by the device 102 three times. In contrast to the individual prior probabilities (e.g., 0%, 33%, 66% or 100%), the third group 836 as a whole had a group prior probability 838 of 60%. Finally, the fourth table 840 illustrates observation data being combined in a fourth group 846 for words that were observed by the device 102 between one and three times. In contrast to the individual prior probabilities (e.g., ranging from 0% to 100%), the fourth group 846 as a whole had a group prior probability 848 of 60%. While FIG. 8 illustrates each of the group prior probabilities 818-848 being equal and having a value of 60%, the disclosure is not limited thereto and the group prior probabilities 818-848 may vary based on the observation data included.

For ease of illustration, the tables 810-840 only illustrate observation data being combined for five words. However, the disclosure is not limited thereto and an amount of observation data and a number of words included in each of the tables 810-840 may vary based on a number of factors without departing from the present disclosure. For example, each of the tables 810-840 may include every available word observed a first number of times or within a first range of observation frequencies. Alternatively, each of the tables 810-840 may include a subset of available words that the device 102 determines are most similar to a predicted word. For example, if the device 102 generates a predicted word that is a noun and has a first number of observations, the device 102 may identify a first group of words having the first number of observations and identify a second group, which is a subset of the first group, including only nouns. The device 102 may determine a group prior probability by combining observation data only for the second group of words, thus tailoring the second group to the predicted word in order to improve a reliability of the group prior probability as an indicator that the predicted word is correct. Additionally or alternatively, the first group of words may share a language frequency (e.g., a frequency of usage in language) or may be any group of words sharing a *nexus*. For example, the device 102 may receive the first group of words from an external device, user input or the like and the first group of words may be selected based on shared characteristics determined based on user preferences, settings or the like.

Figure 9:
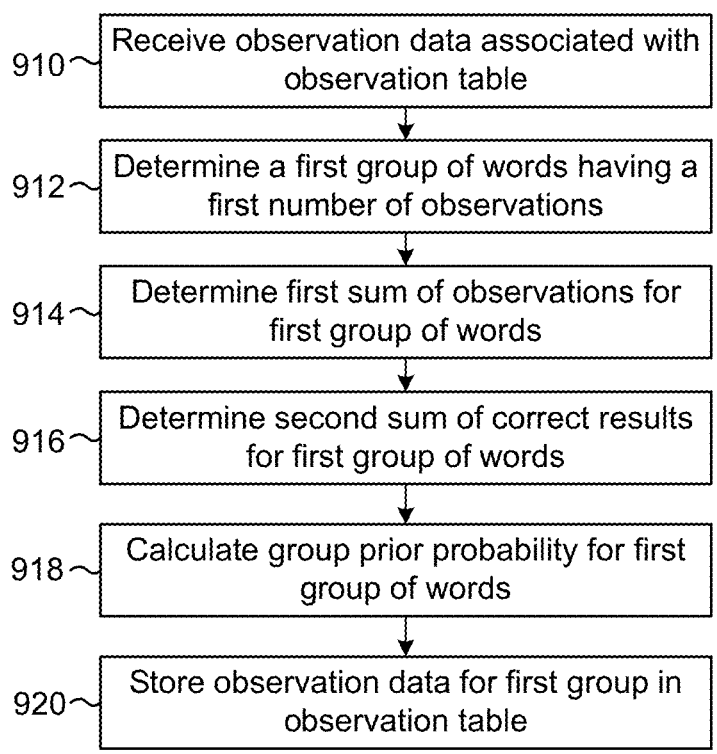
FIG. 9 is a flowchart conceptually illustrating an example method for determining group prior probabilities according to embodiments of the present disclosure.

In some examples, the device 102 may determine group prior probabilities separately from performing ASR. For example, determining group prior probabilities prior to performing ASR processing may improve performance as the device 102 may retrieve the previously calculated group prior probabilities during the ASR without additional processing. FIG. 9 is a flowchart conceptually illustrating an example method for determining group prior probabilities according to embodiments of the present disclosure.

As illustrated in FIG. 9, the device 102 may receive (910) observation data associated with an observation table and may determine (912) a first group of words having a first number of observations. For example, the first number of observations may be any integer between zero and a threshold and the device 102 may identify words having the first number of observations. The device 102 may determine (914) a first sum of observations for the first group of words, determine (916) a second sum of correct results for the first group of words, calculate (918) a group prior probability (e.g., a percentage of second sum to the first sum) for the first group of words and store (920) observation data for the first group in the observation table.

While FIG. 9 illustrates an example of the device 102 calculating a group prior probability for a group of words having an identical number of observations, the disclosure is not limited thereto. Instead, the device 102 may calculate a group prior probability for a group of words having a number of observations within a range. For example, the range may be from one to three, including words having between one observation and three observations.

FIG. 10 illustrates an example of using a group prior probability for an infrequently observed word according to embodiments of the present disclosure. As illustrated in FIG. 10, an observation table 1010 may include observation data associated with a hypothesis 1020. To determine prior probabilities 1022 associated with the hypothesis 1020, the device 102 may use the observation table 1010 to determine individual prior probabilities.

For example, observation data associated with first words in the hypothesis 1020 include a large or medium number of observations (corresponding to frequent words or occasional words, respectively), and corresponding individual prior probabilities are used for the individual first words (i.e., "Play," "I've," "a," "By," "The" and "Eyed"). Observation data associated with second words in the hypothesis 1020 include a small number of observations (corresponding to infrequent words), but in this example the number of observations exceeded a threshold so corresponding individual prior probabilities are used for the individual second words (i.e., "Feeling" and "Black").

Finally, observation data associated with third words in the hypothesis 1020 include a small number of observations that are below the threshold, so corresponding estimated prior probabilities are based on group prior probabilities for the individual third words (i.e., "Got" and "Peas") instead of the individual prior probability for the third words. For example, a predicted word 1012 (i.e., "Got") was observed three times, so the estimated prior probability 1024 associated with the predicted word 1012 is based on the group prior probability 1014 for words that were observed three times (i.e., 65%), instead of the individual prior probability for the predicted word 1012 (i.e., 33%). Similarly, "Peas" was observed once, so the estimated prior probability associated with "Peas" is based on the group prior probability for words that were observed once (i.e., 65%), instead of the individual prior probability for "Peas" (i.e., 0%).

Figure 11:
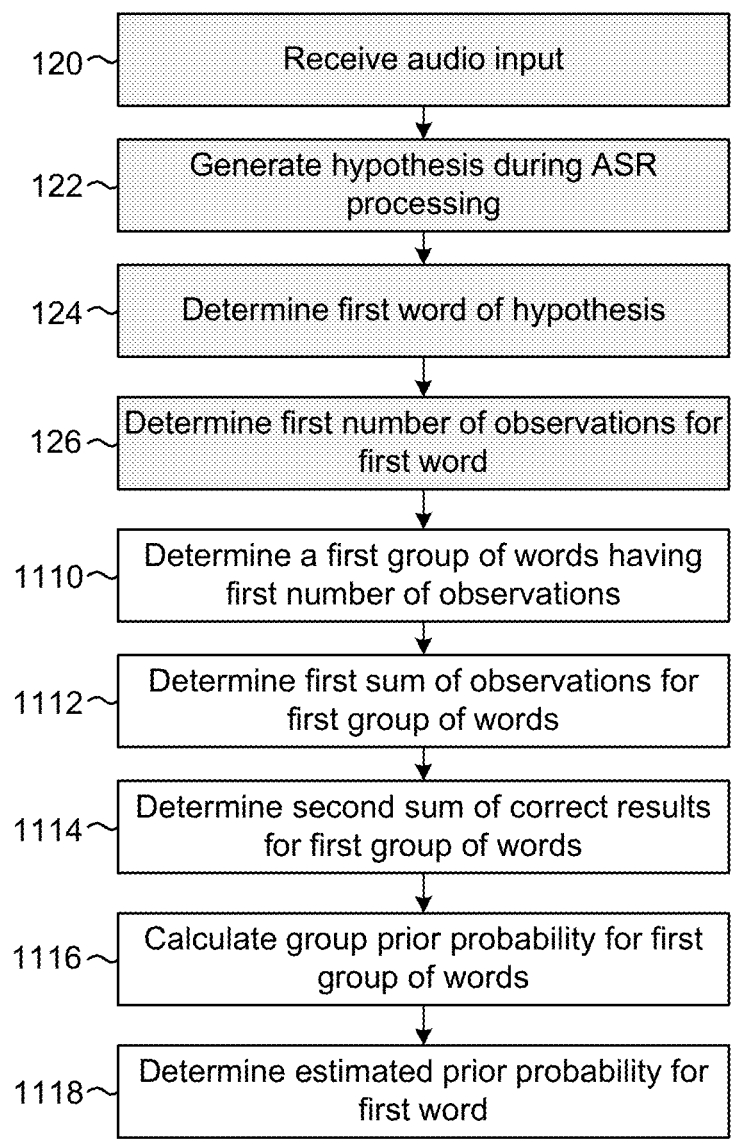
FIG. 11 is a flowchart conceptually illustrating an example method for determining an estimated prior probability for an infrequently observed word according to embodiments of the present disclosure.

FIG. 11 is a flowchart conceptually illustrating an example method for determining an estimated prior probability for an infrequently observed word according to embodiments of the present disclosure. As steps 120-126 are described in greater detail above with regard to FIG. 1, a detailed description of these steps is omitted.

After determining the first number of observations for the first word in step 126, the device 102 may determine (1110) a first group of words having the first number of observations. The device 102 may determine (1112) a first sum of observations for the first group of words, determine (1114) a second sum of correct results for the first group of words, calculate (1116) a group prior probability for the first group of words and determine (1118) an estimated prior probability for the first word based on the group prior probability.

FIG. 12 illustrates an example of using a group prior probability for previously unencountered vocabulary according to embodiments of the present disclosure. Previously unencountered vocabulary are words predicted by the ASR processing that were never hypothesized during training and/or previous ASR processing, resulting in zero observations in the observation table 1210. As illustrated in FIG. 12, an observation table 1210 may include observation data associated with a hypothesis 1220. To determine prior probabilities 1222 associated with the hypothesis 1220, the device 102 may use the observation table 1210 to determine individual prior probabilities.

As discussed above with regard to FIG. 10, observation data associated with first words and second words in the hypothesis 1220 include a number of observations above a threshold, and corresponding individual prior probabilities are used for the individual first and second words (i.e., "Play," "I've," "a," "Feeling," "By," "The," "Black" and "Eyed"). In addition, observation data associated with third words in the hypothesis 1220 include a small number of observations that are below the threshold, so corresponding individual prior probabilities are based on group prior probabilities for the individual third words (i.e., "Got" and "Peas") instead of the individual prior probability for the individual third words.

However, in contrast to the observation table 1010 illustrated in FIG. 10, the observation table 1210 illustrated in FIG. 12 includes zero observations for the predicted word 1212 (i.e., "Peas"). Thus, the device 102 has no observation data with which to determine a prior probability, and combining observation data for other words with a similar observation frequency suffers the same deficiency. To resolve this issue, the device 102 may use the group prior probability 1214 associated with words having one observation as an estimated prior probability 1224 for the predicted word 1212. For example, FIG. 12 illustrates the estimated prior probability 1224 based on the group prior probability 1214 for words that were observed once (i.e., 62%), instead of the individual prior probability for the predicted word 1212 (i.e., 0%).

Figure 13:
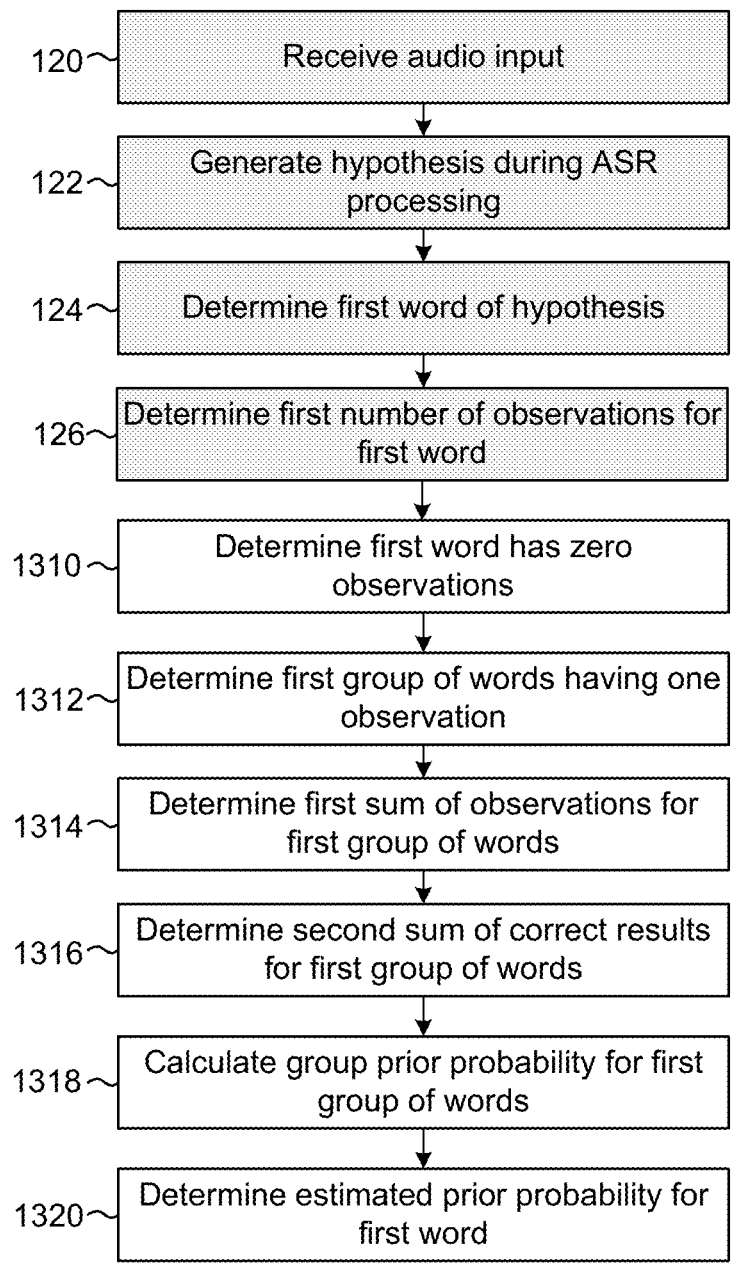
FIG. 13 is a flowchart conceptually illustrating an example method for determining an estimated prior probability for previously unencountered vocabulary according to embodiments of the present disclosure.

FIG. 13 is a flowchart conceptually illustrating an example method for determining an estimated prior probability for previously unencountered vocabulary according to embodiments of the present disclosure. As steps 120-126 are described in greater detail above with regard to FIG. 1, a detailed description of these steps is omitted.

After determining the first number of observations for the first word in step 126, the device 102 may determine (1310) that the first word has zero observations. As a group prior probability for words having zero observations would be meaningless, the device 102 may determine (1312) a first group of words having one observation. The device 102 may determine (1314) a first sum of observations for the first group of words, determine (1316) a second sum of correct results for the first group of words, calculate (1318) a group prior probability for the first group of words and determine (1320) an estimated prior probability for the first word based on the group prior probability.

Figure 14:
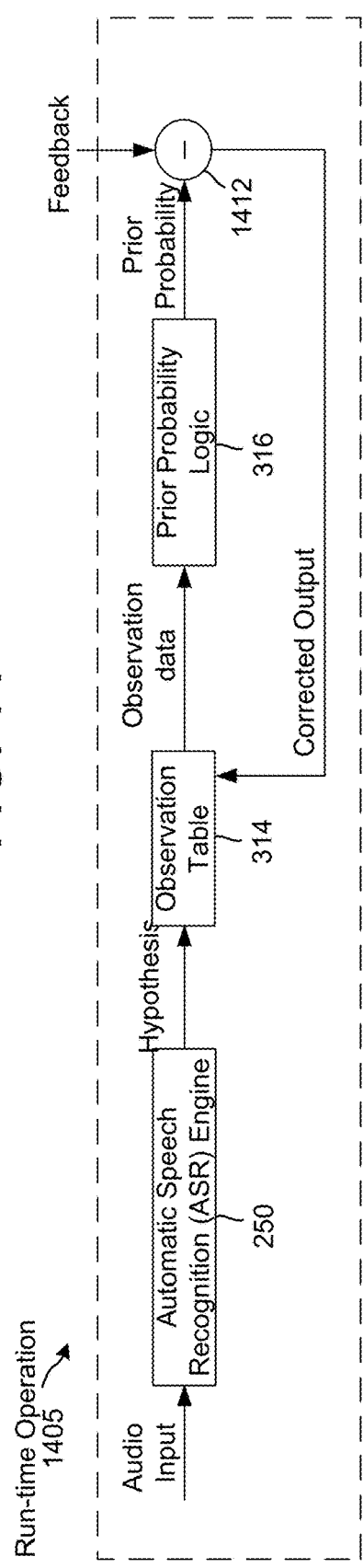
FIG. 14 illustrates an example system diagram for updating an observation table during run-time operation according to embodiments of the present disclosure.

FIG. 14 illustrates an example system diagram for updating an observation table during run-time operation according to embodiments of the present disclosure. During the run-time operation 1405, the device 102 may receive an audio input and may use the ASR engine 250 to generate a hypothesis. The device 102 may retrieve observation data associated with the hypothesis from the observation table 314 and may determine a prior probability using prior probability logic 316. For example, the device 102 may identify the first word in the hypothesis and may retrieve observation data associated with the first word to determine that a prior probability associated with the first word is 90%. However, in contrast to the run-time operation 305 illustrated in FIG. 3B, the run-time operation 1405 includes an updating step to update the observation table 314 during run-time of the device 102. Thus, in addition to observation data derived from test input during a training step, the observation table 314 includes additional observation data as words are observed and verified, resulting in variations in prior probabilities and/or a number of observations for observed words.

To illustrate the updating step, the run-time operation 1405 may output a hypothesis and associated prior probabilities and may receive feedback as an input. The device 102 may compare the feedback to the hypothesis in a difference block 1412 to generate corrected output and may update the observation table 314 using the corrected output. For example, the device 102 may display the hypothesis to a user 10 along with alternative options and the user 10 may provide feedback selecting an alternative option. The device 102 may compare the alternative option to the hypothesis to generate the corrected output and update the observation table 314. For example, a number of observations and a number of correct results will increment for observation data associated with correctly predicted words, while only a number of observations will increment for observation data associated with incorrectly predicted words.

While FIG. 14 illustrates the difference block 1412 generating the corrected output, the disclosure is not limited thereto. Instead, the feedback may be input directly to the observation table 314 to increment the number of observations and/or number of correct results for corresponding correctly and incorrectly predicted words. For example, the device 102 may display the hypothesis to the user 10 and the user 10 may confirm that the hypothesis is correct, resulting in the number of observations and the number of correct results to increment for correctly predicted words. Alternatively, the user 10 may indicate that the hypothesis is incorrect, resulting in the number of observations to increment for incorrectly predicted words.

Figure 15:
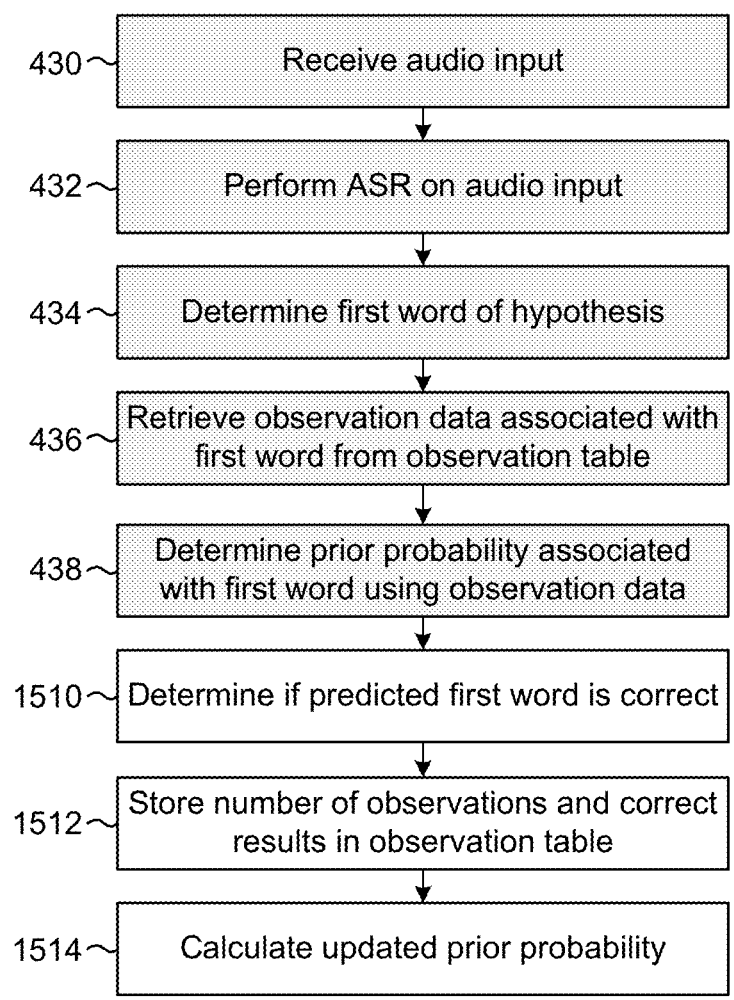
FIG. 15 is a flowchart conceptually illustrating an example method for updating an observation table during run-time operation according to embodiments of the present disclosure.

FIG. 15 is a flowchart conceptually illustrating an example method for updating an observation table during the run-time operation 1405 according to embodiments of the present disclosure. For example, the device 102 may receive (430) an audio input, may perform (432) ASR on the audio input to generate a hypothesis, may determine (434) a first word of the hypothesis, may retrieve (436) observation data associated with the first word from the observation table and may determine (438) a prior probability associated with the first word using the observation data, as discussed in greater detail above with regard to FIG. 4B.

The device 102 may determine (1510) if the predicted first word is correct. The device 102 may determine that the predicted first word is correct based on feedback from the user 10, based on self-learning algorithms or other methods known to one of skill in the art. For example, the device 102 may display the predicted first word to the user 10 and may receive feedback from the user 10 confirming that the predicted first word is correct or indicating that the predicted first word is incorrect. The device 102 may update (1512) a number of observations and/or correct results in the observation table. For example, the device 102 may update the number of observations and the number of correct results for correctly predicted words while only updating the number of observations for incorrectly predicted words.

The device 102 may calculate (1514) an updated prior probability for the correctly predicted words, the incorrectly predicted words and/or groups of words. For example, if a correctly predicted first word had previously been observed twice with one correct result, the observation data associated with the first word would be updated to reflect that the first word had been observed three times with two correct results, increasing the prior probability from 50% to 66%. In addition, the first word would move from a first group of words having two observations to a second group of words having three observations, and the group prior probabilities for the first group and the second group would be updated accordingly.

In a static observation table that is only updated during a training step using test input, observation data does not change. Therefore, prior probabilities for individual words are constant and infrequent words are associated with group prior probabilities, which are also constant. When the observation table is updated during run time operation 1405, however, observation data changes over time. Therefore, prior probabilities for individual words are updated and infrequent words are associated with different group prior probabilities based on the number of observations. For example, when observation data for a first word is updated from two observations to three observations, the device 102 associates the first word with a group prior probability for words with three observations instead of a group prior probability for words with two observations.

In addition to changing the group prior probability associated with the first word, updating observation data associated with the first word may result in a number of observations associated with the first word transitioning from below a threshold to above the threshold. FIG. 16 illustrates an example of using group prior probabilities for an infrequently observed word until observations exceed a threshold according to embodiments of the present disclosure.

As illustrated in FIG. 16, a first table 1610 includes an infrequent word having three observations. Therefore, the device 102 determines a group prior probability 1612 for words having three observations (i.e., 65%) and the group prior probability 1612 is used as the estimated prior probability 1614 for the infrequent word. After the device 102 predicts the infrequent word and updates the observation data a first time, the infrequent word has four observations, as shown in second table 1620. Therefore, the device 102 determines a group prior probability 1622 for words having four observations (i.e., 71%) and the group prior probability 1622 is used as the estimated prior probability 1624 for the infrequent word. After the device 102 predicts the infrequent word and updates the observation data a second time, the infrequent word has five observations, as shown in third table 1630. Therefore, the device 102 determines a group prior probability 1632 for words having five observations (i.e., 69%) and the group prior probability 1632 is used as the estimated prior probability 1634 for the infrequent word.

However, after the device 102 predicts the infrequent word and updates the observation data a third time, the infrequent word has six observations, as shown in fourth table 1640, which is above a threshold of five used in this example. Therefore, the device 102 determines a prior probability 1642 for the infrequent word and the prior probability 1642 is used as the estimated prior probability 1644 for the infrequent word. While the threshold is set at a value of five in this example, the disclosure is not limited thereto and the threshold may vary. For example, if the threshold was set at a value of ten, the estimated prior probability 1644 would be equal to a group prior probability for words that were observed six times.

Figure 17:
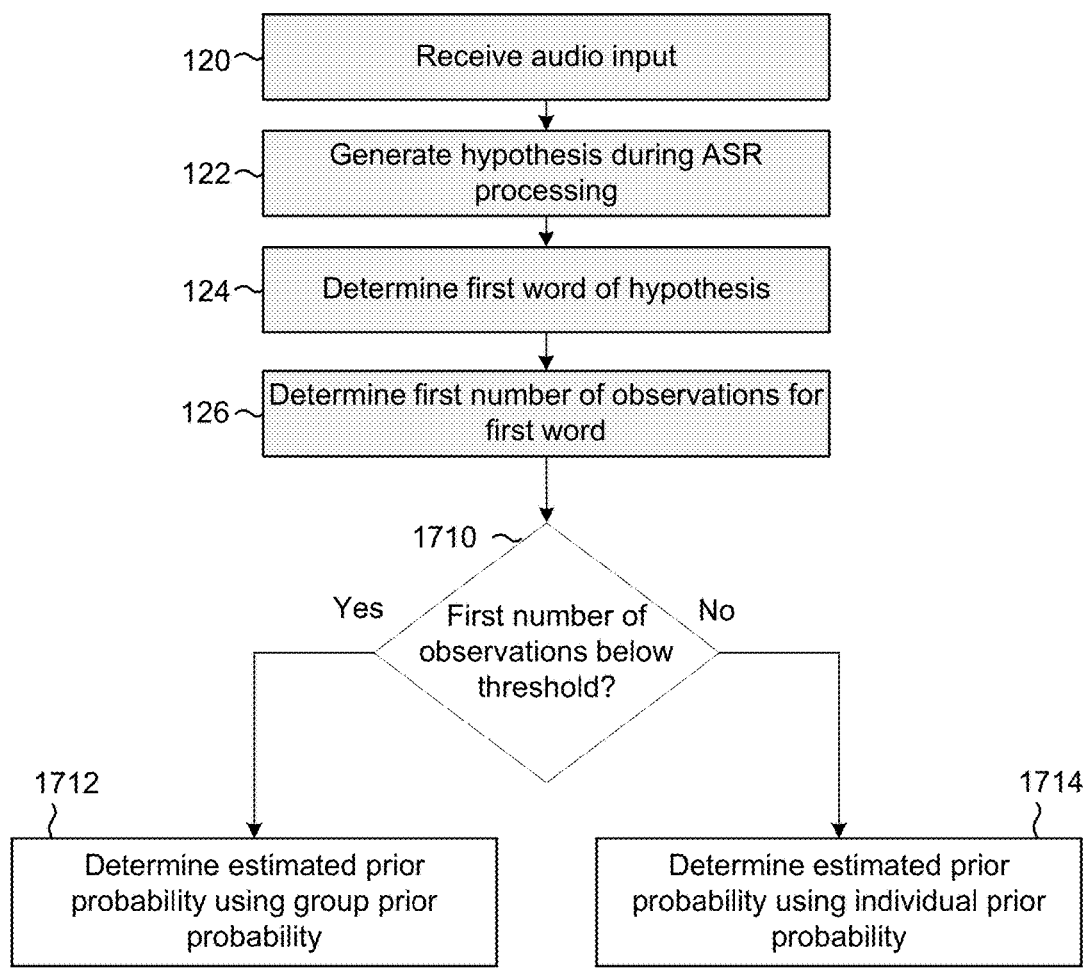
FIG. 17 is a flowchart conceptually illustrating an example method for using group prior probabilities for an infrequently observed word until observations exceed a threshold according to embodiments of the present disclosure.

FIG. 17 is a flowchart conceptually illustrating an example method for using group prior probabilities for an infrequently observed word until observations exceed a threshold according to embodiments of the present disclosure. As steps 120-126 are described in greater detail above with regard to FIG. 1, a detailed description of these steps is omitted.

After determining the first number of observations for the first word in step 126, the device 102 may determine (1710) if the first number of observations is below a threshold. If the first number of observations is below the threshold, the device 102 may determine (1712) an estimated prior probability using a group prior probability, as described in greater detail above. If the first number of observations exceeds the threshold, the device 102 may determine (1714) the estimated prior probability using the individual prior probability associated with the first word. Thus, the device 102 may determine the estimated prior probability for the first word based on the group prior probability until the first number of observations exceeds the threshold, at which point the device 102 may transition to using the individual prior probability.

When the observation table is updated during run time operation 1405, observation data changes over time. Therefore, individual prior probabilities for individual words are updated and prior probabilities for infrequent words are determined using group prior probabilities, based on the number of observations, until the number of observations transitions from below a threshold to above the threshold, as illustrated in FIG. 16. However, a group prior probability associated with a first word when the number of observations is below the threshold may vary from an individual prior probability associated with the first word when the number of observations is above the threshold, resulting in a rapid change in the prior probability associated with the first word.

To reduce the rapid change in the prior probability associated with the first word as the number of observations transitions from below the threshold to above the threshold, the device 102 may determine an estimated prior probability using weighted values for the individual prior probability associated with the first word and a group prior probability associated with the first word. FIG. 18 illustrates an example of determining a weighted estimated prior probability until observations exceed a threshold according to embodiments of the present disclosure.

As illustrated in FIG. 18, observation data associated with an infrequent word is updated three times, from three observations in a first table 1810 to six observations in a fourth table 1840, similar to FIG. 16. However, the estimated prior probabilities associated with the infrequent word are calculated using a weighted average of the individual prior probability associated with the first word and a group prior probability associated with the first word.

FIG. 18 illustrates the device 102 determining the estimated prior probability using a weighting system that depends on a difference between a number of observations of the infrequent word and a threshold value. For example, the weighting system illustrated in FIG. 18 uses four transitions and a threshold value of five. Thus, when the number of observations is two or below, the device 102 uses a weight of 0% for the individual prior probability and 100% for the group prior probability, when the number of observations is three the device 102 uses a weight of 25% for the individual prior probability and 75% for the group prior probability, when the number of observations is four, the device 102 uses a weight of 50% for the individual prior probability and 50% for the group prior probability, when the number of observations is five the device 102 uses a weight of 75% for the individual prior probability and 25% for the group prior probability, and when the number of observations is six or above, the device 102 uses a weight of 100% for the individual prior probability and 0% for the group prior probability. However, the device 102 may calculate the estimated prior probability using multiple different weighting techniques and the disclosure is not limited thereto. Instead, a number of transitions and a value for the threshold may vary without departing from the present disclosure. Alternatively, the weighting may be constant and not vary based on the number of observations.

As illustrated in FIG. 18, a first table 1810 includes observation data associated with the infrequent word based on a training step. For example, the infrequent word was observed three times with one correct result, resulting in a 33% prior probability. The device 102 combines observation data associated with words having three observations to determine a group prior probability of 65%. The device 102 calculates a weighted average 1812 using the individual prior probability and the group prior probability. As the weighting system uses four transitions and a threshold value of five, the weighted average 1812 uses a weighting of 0.25 for the individual prior probability and a weighting of 0.75 for the group prior probability to determine an estimated prior probability 1814 of 57%.

After the device 102 predicts the infrequent word and updates the observation data a first time, the infrequent word has four observations, as shown in second table 1820. For example, the infrequent word was observed four times with two correct results, resulting in a 50% prior probability. The device 102 combines observation data associated with words having four observations to determine a group prior probability of 71%. The device 102 calculates a weighted average 1822 using the individual prior probability and the group prior probability. As the weighting system uses four transitions and a threshold value of five, the weighted average 1822 uses a weighting of 0.5 for the individual prior probability and a weighting of 0.5 for the group prior probability to determine an estimated prior probability 1824 of 60.5%.

After the device 102 predicts the infrequent word and updates the observation data a second time, the infrequent word has five observations, as shown in third table 1830. For example, the infrequent word was observed five times with three correct results, resulting in a 60% prior probability. The device 102 combines observation data associated with words having five observations to determine a group prior probability of 71%. The device 102 calculates a weighted average 1832 using the individual prior probability and the group prior probability. As the weighting system uses four transitions and a threshold value of five, the weighted average 1832 uses a weighting of 0.75 for the individual prior probability and a weighting of 0.25 for the group prior probability to determine an estimated prior probability 1834 of 62.75%.

However, after the device 102 predicts the infrequent word and updates the observation data a third time, the infrequent word has six observations, as shown in fourth table 1840, which is above the threshold of five used in this example. At this point, the infrequent word was observed six times with four correct results, resulting in a 66% prior probability. As the number of observations exceeds the threshold, the individual prior probability is used to determine the estimated prior probability 1844. However, to further illustrate the technique, the fourth table 1840 includes a group prior probability of 72% for combined observation data associated with words having six observations. The device 102 may calculate a weighted average 1842 using the individual prior probability and the group prior probability, but as the number of observations exceeds the threshold, the weighted average 1842 uses a weighting of 1.0 for the individual prior probability and a weighting of 0.0 for the group prior probability.

While the threshold is set at a value of five in this example, the disclosure is not limited thereto and the threshold may vary. For example, if the threshold was set at a value of ten, the estimated prior probability 161844 would be equal to a group prior probability for words that were observed six times.

FIG. 19 is a flowchart conceptually illustrating an example method for determining a weighted estimated prior probability until observations exceed a threshold according to embodiments of the present disclosure. As steps 120-126 are described in greater detail above with regard to FIG. 1, a detailed description of these steps is omitted.

After determining the first number of observations for the first word in step 126, the device 102 may determine (1910) if the first number of observations is below a threshold. If the first number of observations is below the threshold, the device 102 may determine (1912) a difference between the first number of observations and a threshold and may determine (1914) a weighting based on the difference and the threshold, as discussed above with regard to FIG. 18. The device 102 may determine (1916) an estimated prior probability for the first word by weighting an individual prior probability for the first word and a group prior probability for a group of words having the first number of observations. If the first number of observations exceeds the threshold in step 1910, the device 102 may determine (1918) the estimated prior probability using the individual prior probability associated with the first word. Thus, the device 102 may determine the estimated prior probability for the first word based on the group prior probability until the first number of observations exceeds the threshold, at which point the device 102 may transition to using the individual prior probability.

Figure 20:
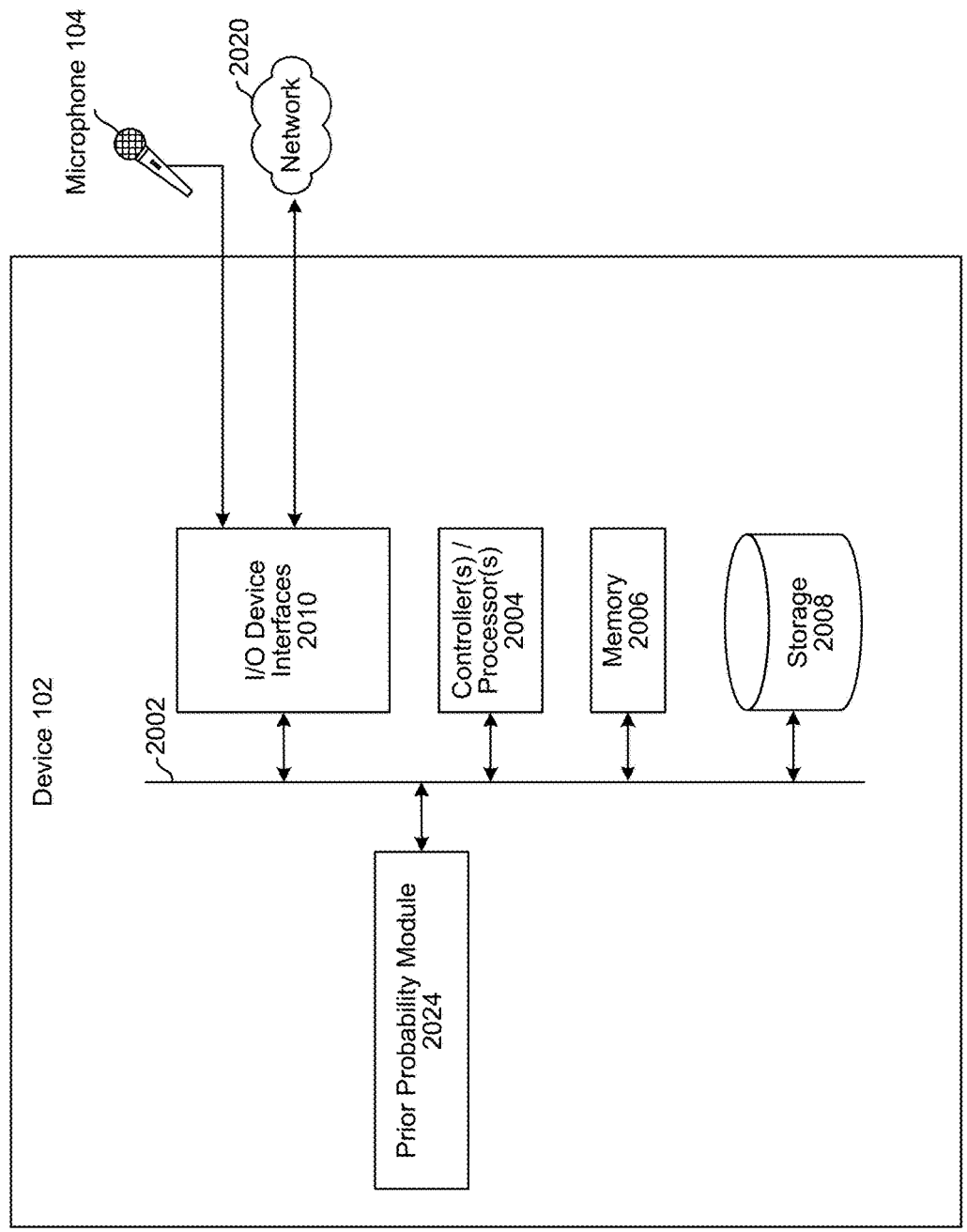
FIG. 20 is a block diagram conceptually illustrating example components of a system according to embodiments of the present disclosure.

FIG. 20 illustrates a block diagram conceptually illustrating example components of a system including a computing device 102. Other components not illustrated may also be included in the device 102. In operation, the system may include computer-readable and computer-executable instructions that reside in storage 2008 on the device 102. Examples of electronic devices may include computers (e.g., a desktop, a laptop, a server or the like), portable devices (e.g., an electronic reader, smart phone, tablet or the like), media devices (e.g., televisions, video game consoles, headless devices or the like) or the like. The device 102 may also be a component of any of the abovementioned devices or systems. The device 102 may also include a remote device (such as a remote server) that is located separately from a user 10.

As illustrated in FIG. 20, the device 102 may include an address/data bus 2002 for conveying data among components of the computing device 102. Each component within the computing device 102 may also be directly connected to other components in addition to (or instead of) being connected to other components across the bus 2002.

The computing device 102 may include one or more controllers/processors 2004 comprising one-or-more central processing units (CPUs) for processing data and computer-readable instructions and a memory 2006 for storing data and instructions. The memory 2006 may include volatile random access memory (RAM), non-volatile read only memory (ROM), non-volatile magnetoresistive (MRAM) and/or other types of memory. The device 102 may also include a data storage component 2008 for storing data and processor-executable instructions. The data storage component 2008 may include one or more non-volatile storage types such as magnetic storage, optical storage, solid-state storage, etc. The device 102 may also be connected to a removable or external non-volatile memory and/or storage (such as a removable memory card, memory key drive, networked storage, etc.) through the input/output device interfaces 2010. The input/output device interfaces 2010 may be configured to operate with a network 2020, for example a wireless local area network (WLAN) (such as WiFi), Bluetooth, zigbee and/or wireless networks, such as a Long Term Evolution (LTE) network, WiMAX network, 3G network, etc. The network 2020 may include a local or private network or may include a wide network such as the internet. Devices may be connected to the network 2020 through either wired or wireless connections.

The device 102 includes input/output device interfaces 2010. A variety of components may be connected through the input/output device interfaces 2010, such as a display or display screen (not shown), which may have a touch surface or touchscreen. However, the disclosure is not limited thereto and the device 102 may not include an integrated touchscreen or display. Thus, the display and other components may be integrated into the device 102 or may be separate without departing from the disclosure. If included, the display may be a video output device for displaying images. The display may be a display of any suitable technology, such as a liquid crystal display, an organic light emitting diode display, electrophoretic display, electrowetting display, an electrochromic display, a cathode ray tube display, a pico projector or other suitable component(s). The display may also be implemented as a touchscreen.

The input/output device interfaces 2010 may also include an interface for an external peripheral device connection such as universal serial bus (USB), FireWire, Thunderbolt, Ethernet port or other connection protocol that may connect to networks 2020. The input/output device interfaces 2010 may also include a connection to an antenna (not shown) to connect one or more networks 2020 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 102 further includes a prior probability module 2024, which may comprise processor-executable instructions stored in storage 2008 to be executed by controller(s)/processor(s) 2004 (e.g., software, firmware), hardware, or some combination thereof. For example, components of the prior probability module 2024 may be part of a software application running in the foreground and/or background on the device 102. The prior probability module 2024 may control the device 102 as discussed above, for example with regard to FIGS. 1, 4A-4B, 9, 11, 13, 15, 17 and/or 19. Some or all of the controllers/modules of the prior probability module 2024 may be executable instructions that may be embedded in hardware or firmware in addition to, or instead of, software. In one embodiment, the computing device 102 may operate using an Android® operating system (such as Android® 4.3 Jelly Bean, Android® 4.4 KitKat or the like).

Executable instructions for operating the device 102 and its various components may be executed by the controller(s)/processor(s) 2004, using the memory 2006 as temporary "working" storage at runtime. The executable instructions may be stored in a non-transitory manner in non-volatile memory 2006, storage 2008, or an external device. Alternatively, some or all of the executable instructions may be embedded in hardware or firmware in addition to or instead of software.

Figure 21:
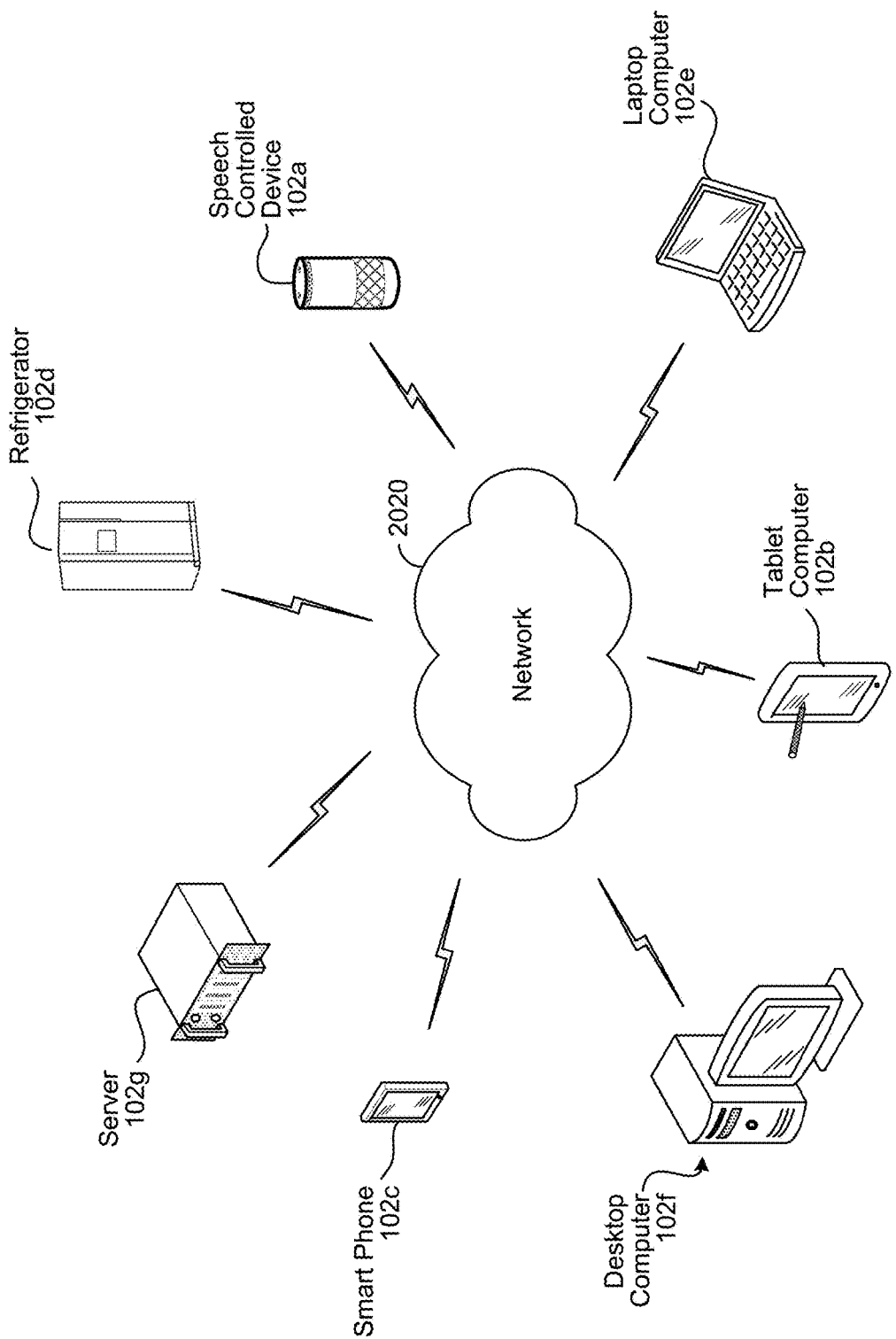
FIG. 21 illustrates an example of a computer network for use with the system.

As illustrated in FIG. 21, multiple devices (102a to 102g) may contain components of the system 100 and the devices may be connected over the network 2020. Network 2020 may include a local or private network or may include a wide network such as the internet. Devices may be connected to the network 2020 through either wired or wireless connections. For example, a speech controlled device 102a, a tablet computer 102b, a smart phone 102c, and a refrigerator 102d may be connected to the network 2020 through a wireless service provider, over a WiFi or cellular network connection or the like. Other devices are included as network-connected support devices, such as laptop computer 102e, desktop computer 102f, and a server 102g. The support devices may connect to the network 2020 through a wired connection or wireless connection. Networked devices 2020 may capture audio using one-or-more built-in or connected microphones or audio capture devices, with processing performed by ASR, NLU, or other components of the same device or another device connected via network 2020, such as an ASR 250, NLU 260, etc. of one or more servers 102g.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

The concepts disclosed herein may be applied within a number of different devices and computer systems, including, for example, general-purpose computing systems, televisions, stereos, radios, server-client computing systems, mainframe computing systems, telephone computing systems, laptop computers, cellular phones, personal digital assistants (PDAs), tablet computers, wearable computing devices (watches, glasses, etc.), other mobile devices, etc.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method of determining a confidence score for a potential speech recognition result, the method comprising:
    determining a first group of words, wherein each word of the first group of words was predicted a first number of times during automatic speech recognition (ASR) testing;
    determining a first total number of predictions for the first group, the first total number of predictions corresponding to the first number multiplied by a number of words in the first group of words;
    determining a first total number of correct results for the first group, the first total number of correct results corresponding to a cumulative number of times each word of the first group was correctly predicted during the ASR testing;
    determining a first group prior probability for the first group by dividing the first total number of correct results by the first total number of predictions;
    determining a first prior probability for a first word using the first group prior probability;
    receiving audio data corresponding to a first utterance; and
    performing first ASR processing on the audio data to generate a hypothesis, the hypothesis including the first word, wherein performing first ASR processing further comprises determining a confidence score for the hypothesis using the first prior probability for the first word.

2. The computer-implemented method of claim 1, further comprising:
    determining the first number of times is equal to one;
    determining that the first word was not predicted during the ASR testing; and
    determining to use the first group prior probability for the first word.

3. The computer-implemented method of claim 1, further comprising:
    performing second ASR processing on a second utterance, the second ASR processing predicting the first word;
    determining a total number of first predictions for the first word by adding a number of times the first word was predicted during the ASR testing and a number of times the first word was predicted during the first ASR processing;
    determining that the total number of first predictions for the first word exceeds a threshold;
    determining a first number of correct results for the first word, the first number of correct results corresponding to a number of times the first word was correctly predicted during the ASR testing and the first ASR processing; and
    determining a second prior probability for the first word by dividing the first number of correct results by the total number of first predictions,
    wherein determining the confidence score further comprises determining the confidence score for the hypothesis using the second prior probability for the first word.

4. The computer-implemented method of claim 1, further comprising:
    receiving a second group of words, wherein the second group of words are grouped based on a language frequency;
    determining a second total number of predictions for the second group, the second total number of predictions corresponding to a cumulative number of times each of the second group of words was predicted during the ASR testing;
    determining a second total number of correct results for the second group, the second total number of correct results corresponding to a cumulative number of times each word of the second group was correctly predicted during the ASR testing;
    determining a second group prior probability for the second group by dividing the second total number of correct results by the second total number of predictions;
    determining that a second number of predictions in the ASR testing for a second word of the second group of words is below a threshold;
    determining a second prior probability for the second word using the second group prior probability;
    receiving second audio data corresponding to a second utterance; and
    performing second ASR processing on the second audio data to generate a second hypothesis, the second hypothesis including the second word, wherein performing second ASR processing further comprises determining a confidence score for the hypothesis using the second prior probability for the second word.

5. A computer-implemented method, the method comprising:
    receiving audio data corresponding to a first utterance;
    performing first automatic speech recognition (ASR) processing on the audio data using a language model to generate a hypothesis, the hypothesis including a first word, wherein:
        the language model was trained using a first prior probability for the first word,
        the first prior probability based on a group prior probability for a plurality of words,
        the group prior probability based on a total number of predictions of the plurality of words during ASR testing and a total number of correct predictions of the plurality of words during the ASR testing,
        at least one of the plurality of words is not included in the hypothesis, and
        performing the first ASR processing on the audio data comprises:
            identifying the first word, and
            determining a confidence score for the hypothesis using the language model; and
    generating output data using the hypothesis.

6. The computer-implemented method of claim 5, further comprising:
    identifying a first number of predictions of the first word during ASR testing;
    determining that the first number is below a threshold; and determining the first prior probability, wherein determining the first prior probability further comprises using the group prior probability for the plurality of words as the first prior probability.

7. The computer-implemented method of claim 5, further comprising:
    determining the plurality of words;
    determining the total number of predictions of the plurality of words during ASR testing;
    determining the total number of correct predictions of the plurality of words during the ASR testing; and
    determining the group prior probability for the plurality of words by dividing the total number of correct predictions by the total number of predictions.

8. The computer-implemented method of claim 5, wherein the plurality of words are grouped based on a language frequency.

9. The computer-implemented method of claim 5, further comprising:
    determining that a first number of predictions of the first word during ASR testing is equal to zero, indicating that the first word was not predicted during the ASR testing;
    determining the plurality of words, wherein each of the plurality of words was predicted during the ASR testing more than once;
    determining the total number of predictions of the plurality of words during ASR testing;
    determining the total number of correct predictions of the plurality of words during the ASR testing;
    determining the group prior probability for the plurality of words using the total number of predictions and the total number of correct predictions; and
    determining the first prior probability, wherein determining the first prior probability further comprises determining the group prior probability for the plurality of words as the first prior probability.

10. The computer-implemented method of claim 5, further comprising:
    receiving feedback indicating whether the first word was correctly predicted during the first ASR processing;
    determining a total number of first predictions for the first word by adding a first number of predictions during ASR testing and a second number of times the first word was predicted during the first ASR processing;
    determining a third number of correct results for the first word, the third number of correct results corresponding to a number of times the first word was correctly predicted during the ASR testing and the first ASR processing; and
    determining an individual prior probability for the first word by dividing the third number of correct results and the total number of first predictions.

11. The computer-implemented method of claim 10, further comprising:
    determining that the total number of first predictions exceeds a threshold; and
    determining the first prior probability for the first word using the individual prior probability.

12. The computer-implemented method of claim 10, further comprising:
    determining that the total number of first predictions is below a threshold; and
    determining the first prior probability, wherein determining the first prior probability further comprises determining a weighted average of the individual prior probability and the group prior probability.

13. A system, comprising:
    at least one processor;
    memory including instructions operable to be executed by the at least one processor to cause the system to:
        receive audio data corresponding to a first utterance;
        perform first automatic speech recognition (ASR) processing on the audio data using a language model to generate a hypothesis, the hypothesis including a first word, wherein:
            the language model was trained using a first prior probability for the first word, the first prior probability based on a group prior probability for a plurality of words, the group prior probability based on a total number of predictions of the plurality of words during ASR testing and a total number of correct predictions of the plurality of words during the ASR testing,
            at least one of the plurality of words is not included in the hypothesis, and
            performing the first ASR processing on the audio data comprises:
                identifying the first word, and
                determining a confidence score for the hypothesis using the language model; and
        generate output data using the hypothesis.

14. The system of claim 13, wherein the memory further comprises instructions that, when executed by the at least one processor, further cause the system to:
    identify a first number of predictions of the first word during ASR testing;
    determine that the first number is below a threshold; and
    determine the first prior probability, wherein determining the first prior probability further comprises using the group prior probability for the plurality of words as the first prior probability.

15. The system of claim 13, wherein the memory further comprises instructions that, when executed by the at least one processor, further cause the system to:
    determine the plurality of words;
    determine the total number of predictions of the plurality of words during ASR testing;
    determine the total number of correct predictions of the plurality of words during the ASR testing; and
    determine the group prior probability for the plurality of words by dividing the total number of correct predictions by the total number of predictions.

16. The system of claim 13, wherein the plurality of words are grouped based on a language frequency.

17. The system of claim 13, wherein the memory further comprises instructions that, when executed by the at least one processor, further cause the system to:
    determine that a first number of predictions of the first word during ASR testing is equal to zero, indicating that the first word was not predicted during the ASR testing;
    determine the plurality of words, wherein each of the plurality of words was predicted during the ASR testing more than once;
    determine the total number of predictions of the plurality of words during ASR testing;
    determine the total number of correct predictions of the plurality of words during the ASR testing;
    determine the group prior probability for the plurality of words using the total number of predictions and the total number of correct predictions; and determine the first prior probability, wherein determining the first prior probability further comprises determining the group prior probability for the plurality of words as the first prior probability.

18. The system of claim 13, the set of actions further comprising:
receiving feedback indicating whether the first word was correctly predicted during the first ASR processing;
determining a total number of first predictions for the first word by adding a first number of predictions during ASR testing and a second number of times the first word was predicted during the first ASR processing;
determining a first number of correct results for the first word, the first number of correct results corresponding to a number of times the first word was correctly predicted during the ASR testing and the first ASR processing; and
determining an individual prior probability for the first word by dividing the first number of correct results and the total number of first predictions.

19. The system of claim 18, wherein the memory further comprises instructions that, when executed by the at least one processor, further cause the system to:
determine that the total number of first predictions exceeds a threshold; and
determine the first prior probability for the first word using the individual prior probability.

20. The system of claim 18, wherein the memory further comprises instructions that, when executed by the at least one processor, further cause the system to:
determine that the total number of first predictions is below a threshold; and
determine the first prior probability, wherein determining the first prior probability further comprises determining a weighted average of the individual prior probability and the group prior probability.

21. The computer-implemented method of claim 5, wherein the plurality of words is selected based on a number of times that the first word was predicted during ASR testing.

22. The computer-implemented method of claim 5, wherein identifying the first word comprises using at least the language model to determine that the first word potentially corresponds to the audio data.

23. The computer-implemented method of claim 5, wherein generating the output data comprises causing a command represented by the hypothesis to be executed.

24. A computer-implemented method, the method comprising:
receiving audio data corresponding to a first utterance;
performing first automatic speech recognition (ASR) processing on the audio data using a language model to generate a hypothesis, the hypothesis including a first word, wherein:
the language model was trained using a first prior probability for the first word,
the first prior probability determined by:
determining that a first number of predictions of the first word during ASR testing is equal to zero, indicating that the first word was not predicted during the ASR testing,
determining a plurality of words, wherein each of the plurality of words was predicted during the ASR testing more than once,
determining a total number of predictions of the plurality of words during ASR testing,
determining a total number of correct predictions of the plurality of words during the ASR testing,
determining a group prior probability for the plurality of words using the total number of predictions and the total number of correct predictions, and
setting the group prior probability as the first prior probability,
at least one of the plurality of words is not included in the hypothesis, and
performing first ASR processing on the audio data comprises:
identifying the first word, and
determining a confidence score for the hypothesis using the language model; and
generating output data using the hypothesis.

* * * * *